(12) United States Patent
DePuccio et al.

(10) Patent No.: US 11,786,885 B2
(45) Date of Patent: Oct. 17, 2023

(54) SULFUR-CONTAINING ORGANIC COMPOUND ASSISTED METAL NANOPARTICLE SYNTHESIS FOR THREE-WAY CATALYSIS APPLICATION

(71) Applicant: Johnson Matthey Public Limited Company, London (GB)

(72) Inventors: Daniel Peter DePuccio, Wayne, PA (US); Kevin Charles Kistler, Wayne, PA (US); Dongxia Liu, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 17/818,800

(22) Filed: Aug. 10, 2022

(65) Prior Publication Data
US 2023/0144345 A1 May 11, 2023

Related U.S. Application Data

(60) Provisional application No. 63/260,236, filed on Aug. 13, 2021.

(51) Int. Cl.
*B01J 21/04* (2006.01)
*B01J 21/08* (2006.01)
(Continued)

(52) U.S. Cl.
CPC ............. *B01J 23/42* (2013.01); *B01J 23/58* (2013.01); *B01J 27/053* (2013.01)

(58) Field of Classification Search
CPC ... B01J 21/04; B01J 21/08; B01J 21/12; B01J 23/02; B01J 23/42; B01J 23/44;
(Continued)

(56) References Cited

U.S. PATENT DOCUMENTS 7,473,665 B2 * 1/2009 Kawai ................ B01D 53/9422
502/223
8,323,599 B2 * 12/2012 Nunan ................ B01J 35/0006
60/299
(Continued)

FOREIGN PATENT DOCUMENTS

| EP | 3 854 478 A1 | 7/2021 |
|---|---|---|
| WO | 2014/156746 A1 | 2/2017 |
| WO | 2020/071059 A1 | 4/2020 |

OTHER PUBLICATIONS

Kobayashi, et al., "Effect of basic metal additives on NOx reduction property of Pd-based three-way catalyst", Elsevier, Applied Catalyst B, vol. 30, pp. 287-292, 2001.
(Continued)

*Primary Examiner* — Cam N. Nguyen

(57) ABSTRACT

A method of manufacturing a catalyst article, the method comprising: providing a slurry comprising a support material, palladium ions, alkaline-earth-metal ions and an organic compound, wherein the organic compound comprises a functional group selected from a sulfo group ($-SO_3H$), a sulfonyl group ($-S(=O)_2-$) and a sulfinyl group ($-S(=O)-$); disposing the slurry on a substrate; and heating the slurry to form nanoparticles of the palladium and nanoparticles of a sulfate of the alkaline earth metal on the support material.

7 Claims, 12 Drawing Sheets

(51) Int. Cl.
  *B01J 21/12* (2006.01)
  *B01J 23/02* (2006.01)
  *B01J 23/42* (2006.01)
  *B01J 23/44* (2006.01)
  *B01J 23/46* (2006.01)
  *B01J 23/58* (2006.01)
  *B01J 35/00* (2006.01)
  *B01J 35/04* (2006.01)
  *B01J 27/053* (2006.01)
  *F01N 3/10* (2006.01)
  *F01N 3/28* (2006.01)

(58) Field of Classification Search
  CPC ...... B01J 23/464; B01J 23/58; B01J 35/0006; B01J 35/04; B01J 27/053; F01N 3/101; F01N 3/2803
  USPC ........ 502/258–262, 328, 332–334, 339, 355, 502/415, 439, 527.12, 527.13, 527.19
  See application file for complete search history.

(56) References Cited

U.S. PATENT DOCUMENTS

| | | | |
|---|---|---|---|
| 8,545,780 | B1 | 10/2013 | Chen et al. |
| 8,580,706 | B2* | 11/2013 | Matsueda ............ B01J 37/0244 502/355 |
| 8,741,799 | B2 | 6/2014 | Matsueda et al. |
| 8,835,346 | B2 | 9/2014 | Gramiccioni et al. |
| 9,061,266 | B2* | 6/2015 | Fujimura ................ B01J 23/63 |
| 10,118,156 | B2* | 11/2018 | Horaguchi ............. B01J 37/08 |
| 10,618,034 | B2* | 4/2020 | Kasuya .................. B01J 23/63 |
| 10,710,023 | B2* | 7/2020 | Yanagawa ............. B01J 37/08 |
| 10,737,219 | B2* | 8/2020 | Onozuka ................ B01J 23/10 |
| 11,110,435 | B2* | 9/2021 | Onoe .................... B01J 35/0006 |
| 11,504,700 | B2* | 11/2022 | Oishi .................... B01J 27/053 |
| 2012/0165185 | A1 | 6/2012 | Gramiccioni et al. |
| 2014/0329669 | A1 | 11/2014 | Fujimura et al. |
| 2019/0136730 | A1* | 5/2019 | Onozuka ............ B01D 53/9445 |
| 2020/0030780 | A1 | 1/2020 | Oishi et al. |
| 2020/0391186 | A1* | 12/2020 | Shirakawa ............... B01J 23/63 |
| 2021/0277814 | A1 | 9/2021 | Kawamura et al. |
| 2021/0301706 | A1* | 9/2021 | Chinzei .................. B01J 23/464 |
| 2022/0161236 | A1* | 5/2022 | Vjunov ................... B01J 23/42 |
| 2022/0193639 | A1* | 6/2022 | Vjunov ................ B01J 37/0244 |

OTHER PUBLICATIONS

Tanikawa, et al., "Effect of barium addition over palladium catalyst for Co—No—O2 reaction", Journal of Molecular Catalysis A, Chemical, vol. 349, pp. 94-99, 2011.

Tanikawa, et al., "Effect of barium addition on CO oxidation activity of palladium catalysts", Applied Catalysis A: General, vol. 403, pp. 12-17, 2011.

* cited by examiner

SULFUR-CONTAINING ORGANIC COMPOUND ASSISTED METAL NANOPARTICLE SYNTHESIS FOR THREE-WAY CATALYSIS APPLICATION

FIELD OF THE INVENTION

The invention relates to a method of manufacturing a catalyst article, a catalyst article obtainable by the method, an emission treatment system, and a method of treating an exhaust gas.

BACKGROUND OF THE INVENTION

A three-way catalyst (TWC) allows simultaneous conversions (~98%) of CO, HCs and $NO_x$ from gasoline engine exhaust to innocuous compounds at stoichiometric air-to-fuel ratio. Specifically, the oxidation of CO and HCs to $CO_2$ and steam ($H_2O$) is mainly catalyzed by Pd, while the reduction of $NO_x$ to $N_2$ is mainly catalyzed by Rh. Modern TWCs use supported platinum group metal (hereinafter "PGM") catalysts (Pd, Rh, Pt, etc.) deposited on a single, double or multilayer support, with the support material consisting of metal oxides with high specific surface area, primarily stabilized gamma alumina and ceria-containing oxygen storage materials. The supported catalyst is washcoated on a ceramic monolithic substrate.

Conventional preparation of a TWC washcoat slurry generally involves the use of a solution of an inorganic PGM precursor, e.g. nitrate, acetate, hydroxide or chloride salt, to allow the PGM element to be deposited onto the oxide support via incipient wetness or wet impregnation. Promoter salts are also often added to the washcoat formulations for enhanced TWC performance. Once the monolithic substrate is washcoated with the as-prepared slurry, drying and calcination steps are followed to decompose the inorganic salts and to allow PGM and promoter elements to be fixed onto the support materials. Conventional TWCs prepared using the above method often provide only limited control over the properties of the catalytically active species (i.e. average particle size of PGM and promoters, affiliation of these active components, and metal-support interactions). This is mainly due to the migration and grain growth during drying and high temperature calcination processes.

Typically, Pd is inferior to Rh for the $NO_x$ reduction reaction under rich TWC conditions. Alkaline earth metals, such as barium, are well known to be excellent promoters for Pd's catalytic functions. Ba can donate electrons to Pd, making the electron configuration of $Pd^{(II)}$ more like Rh, and thus can improve the rich NOx reduction activity of a Pd TWC [NON-PATENT DOCUMENT 1]. Both $NO_x$ and CO adsorption intensity on Pd is reduced on Ba-promoted Pd catalysts, resulting in enhanced $NO_x$ and CO conversion [NON-PATENT DOCUMENT 2; NON-PATENT DOCUMENT 3]. Ba also helps to stabilize PdO and suppress the sintering due to the high temperature exposure in the lifetime usage of a three-way catalytic converter. Last but not least, Ba is a good stabilizer for the alumina support material, which helps to maintain the high dispersion of Pd species.

When using a Ba component as an additive, it is important to control the locations and size of both palladium and barium for optimizing the synergistic interactions with the active Pd, the Ba species, and support components. However, in catalysts obtained from known methods, due to the generally larger particle sizes of the alkaline-earth-metal-containing species compared to the Pd nanoparticles, the interaction may not be optimized. Moreover, this interaction may deteriorate on ageing in the catalysts obtained from known methods. Accordingly, there is a need to provide a method of manufacturing a catalyst article that enables a more optimized interaction between the palladium nanoparticles and the alkaline-earth-metal-containing species in the obtained catalyst article, ideally with equivalent particle size and intimate proximity, which enables such an improved performance and also less susceptible to ageing.

A significant amount of effort has been made historically trying to reduce the particle size of barium species to facilitate a closer contact with Pd species, which are mostly located inside the pores of support materials with a nano-scale particle size. Ball/bead milling of the $BaSO_4$ compound is less effective to make nano-scale barium sulfate species [PATENT DOCUMENT 1; PATENT DOCUMENT 6]. Sulfuric acid was added to the Pd washcoat with Ba acetate or Ba hydroxide as a precursor in order to generate a barium sulfate species during the calcination step. A smaller $BaSO_4$ particle size was obtained; however, it is still on the micron level, far away from nano-scale target [PATENT DOCUMENTS 2 to 5]. US 2020/030780 discloses a method of manufacturing a catalyst article that involves the use of a sulfur-containing organic compounds. However, US 2020/030780 involves using a pre-firing process to fix both Pd and Ba onto the same support at first. This process is less cost effective due to the high cost-to-yield ratio of PGM content. In addition, the particle size of the Ba sulfate species is substantially larger than Pd particle size. The method of US 2020/030780 also importantly involves starting with a slurry of a support material, to which the other components of the washcoats are added in succession.

CITATION LIST

Patent Document

PATENT DOCUMENT 1: U.S. Pat. No. 8,741,799
PATENT DOCUMENT 2: US20120165185
PATENT DOCUMENT 3: U.S. Pat. No. 8,545,780
PATENT DOCUMENT 4: U.S. Pat. No. 8,835,346
PATENT DOCUMENT 5: 20140329669
PATENT DOCUMENT 6: WO2014156746
PATENT DOCUMENT 7: US2020030780
Non-Patent Document
NON-PATENT DOCUMENT 1: *Applied Catalyst B*, 30, 2001, 287
NON-PATENT DOCUMENT 2: *Journal of Molecular Catalysis A: Chemical*, 349, 2011, 94
NON-PATENT DOCUMENT 3: *Applied Catalysis A: General* 403, 2011, 12

SUMMARY OF THE INVENTION

One aspect of the present disclosure is directed to a method of manufacturing a catalyst article, the method comprising: providing a slurry comprising a support material, palladium ions, alkaline-earth-metal ions and an organic compound, wherein the organic compound comprises a functional group selected from a sulfo group (—$SO_3H$), a sulfonyl group (—S(=O)$_2$—) and a sulfinyl group (—S(=O)—); disposing the slurry on a substrate; and heating the slurry to form nanoparticles of the palladium and nanoparticles of a sulfate of the alkaline earth metal on the support material.

Another aspect of the present disclosure is directed to a method of manufacturing a catalyst article, the method comprising: providing a solution comprising palladium ions, alkaline-earth-metal ions and an organic compound, wherein the organic compound comprises a functional group selected from a sulfo group (—$SO_3H$), a sulfonyl group (—S(=O)$_2$—) and a sulfinyl group (—S(=O)—); providing a support material; contacting the solution with the support material to form a slurry; disposing the slurry on a substrate; and heating the slurry to form nanoparticles of the palladium and nanoparticles of a sulfate of the alkaline earth metal on the support material.

Another aspect of the present disclosure is directed to a catalyst article for use in an emissions treatment system, the catalyst article comprising: a substrate; and a first catalytic region on the substrate; wherein the first catalytic region comprises a support material, palladium nanoparticles and alkaline earth metal sulfate nanoparticles; and wherein the alkaline earth metal sulfate nanoparticles have a crystallite size of from 0.1 nm to 30 nm.

Another aspect of the present disclosure is directed to a catalyst article for use in an emissions treatment system, the catalyst article comprising: a substrate; and a first catalytic region on the substrate; wherein the first catalytic region comprises a support material, palladium nanoparticles and alkaline earth metal sulfate nanoparticles; and wherein when a cross section of the first catalytic region of the catalyst article is subjected to area analysis by FE-EPMA under conditions of pixel (section) size of 0.34 μm×0.34 μm and number of measured pixels (sections) of 256×256, a characteristic X-ray intensity (α: cps) of the alkaline earth metal element (Ae) and a characteristic X-ray intensity (β: cps) of the palladium (Pd) are measured for each pixel, and the Pearson correlation coefficient calculated using the resulting α and β in each pixel is designated as $R_{Ae/Pd}$, then the value of $R_{Ae/Pd}$ is at least 0.75.

Another aspect of the present disclosure is directed to a catalyst article obtainable by the method in the first aspect.

The invention also encompasses an exhaust system for internal combustion engines that comprises the catalyst article in the second, third or fourth aspects.

Another aspect of the present disclosure is directed to a method of treating an exhaust gas, the method comprising: providing the catalyst article of the second, third or fourth aspects; and contacting the catalyst article with an exhaust gas.

BRIEF DESCRIPTION OF THE DRAWINGS

The invention will now be described in relation to the following non-limiting drawings in which:

FIG. 2b depicts a variation of FIG. 2a.

FIG. 3b depicts a variation of FIG. 3a.

FIG. 4b depicts a variation of FIG. 4a.

FIGS. 5b, 5c, and 5d depict variations of FIG. 5a.

FIGS. 6b and 6c depict variations of FIG. 6a.

FIGS. 7b-7f depict variations of FIG. 7a.

DETAILED DESCRIPTION OF THE INVENTION

Figure 1:
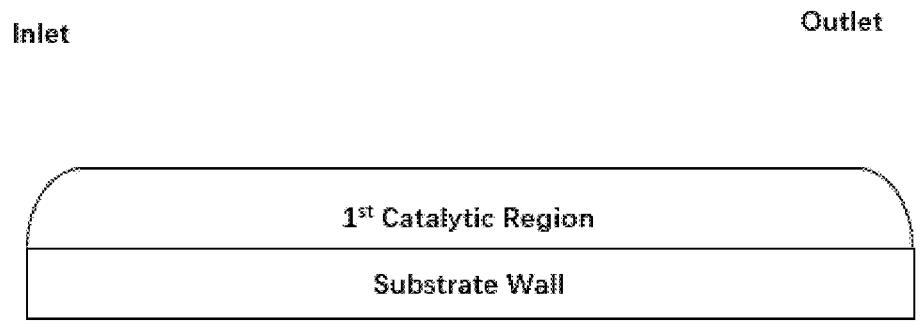
FIG. 1 shows one embodiment according to the present invention, which contains first catalytic region with a length of 100% to the axial length L of the substrate (single layer).
Figure 2A:
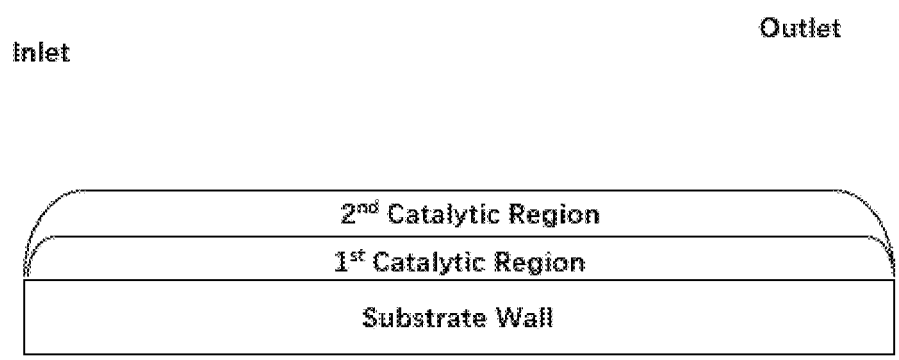
FIG. 2a shows one embodiment according to the present invention, the first catalytic region extends 100% of the axial length L, as bottom layer; the second catalytic region extends 100% of the axial length L, as top layer.
Figure 2B:
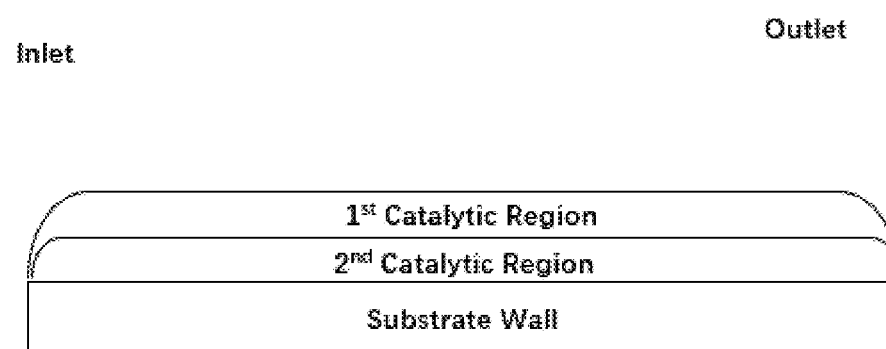

The present invention seeks to tackle at least some of the problems associated with the prior art or at least to provide a commercially acceptable alternative solution thereto.

In a first aspect, the present invention provides a method of manufacturing a catalyst article, the method comprising:

providing a slurry comprising a support material, palladium ions, alkaline-earth-metal ions and an organic compound, wherein the organic compound comprises a functional group selected from a sulfo group (—$SO_3H$), a sulfonyl group (—$S(=O)_2$—) and a sulfinyl group (—$S(=O)$—);

disposing the slurry on a substrate; and heating the slurry to form nanoparticles of the palladium and nanoparticles of a sulfate of the alkaline earth metal on the support material.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

The slurry preferably further comprises an inorganic oxide, more preferably a mixed inorganic oxide.

Providing a slurry comprising a support material, palladium ions, alkaline-earth-metal ions and an organic compound typically comprises contacting the support material, palladium ions, typically in the form of a palladium salt, alkaline-earth-metal ions, typically in the form of an alkaline-earth-metal salt and the organic compound with a solvent, or contacting a first slurry comprising the support material with the palladium ions, typically in the form of a palladium salt, alkaline-earth-metal ions, typically in the form of an alkaline-earth-metal salt and the organic compound, for example. The palladium ions, alkaline-earth-metal ions and organic compound may be combined with the first slurry in any order, sequentially or in unison. The solvent is preferably selected such that each of the palladium ions, alkaline-earth-metal ions and organic compound have high solubility in the solvent. Thus, providing a slurry preferably comprises one or more steps of combining two or more of the support material, palladium ions, alkaline-earth-metal ions, organic compound and optionally an inorganic oxide in a solvent. The solvent preferably comprises water. Providing a slurry comprising a support material, palladium ions, alkaline-earth-metal ions and an organic compound typically further comprises stirring the slurry for an extended period of time, such as for at least 30 minutes.

The method comprises a step of disposing the slurry on a substrate. In other words, the slurry that is provided comprising its constituent parts is disposed on a support material. Preferably, therefore, the slurry is provided by mixing the constituent parts thereof, for example, and then is disposed on a substrate. In other words, there are preferably no intervening steps between providing the slurry (e.g. by mixing its constituent parts) and disposing the slurry on a substrate. Specifically, the slurry is disposed on a substrate. Thus, preferably there are no intervening steps such as drying and firing the provided slurry to form a powder (which would of course likely form nanoparticles of the palladium and/or sulfate of the alkaline earth metal and also remove substantially all organics, such as by thermal decomposition or combustion), and then providing a further separate slurry by adding such a powder to a solvent, which is then disposed on a support material.

In a second aspect, the present invention provides a method of manufacturing a catalyst article, the method comprising:

providing a solution comprising palladium ions, alkaline-earth-metal ions and an organic compound, wherein the organic compound comprises a functional group selected from a sulfo group (—$SO_3H$), a sulfonyl group (—$S(=O)_2$—) and a sulfinyl group (—$S(=O)$—);

providing a support material;

contacting the solution with the support material to form a slurry;

disposing the slurry on a substrate; and heating the slurry to form nanoparticles of the palladium and nanoparticles of a sulfate of the alkaline earth metal on the support material.

Surprisingly, when used in an emission treatment system, the catalyst article manufactured by the method of the present invention (e.g. the first or the second aspects) may exhibit favourable catalytic activity, in particular favourable three-way catalytic activity. For example, the catalyst article may exhibit favourable light-off performance, in particular conversions of NO, CO and total hydrocarbons, during three-way catalytic emissions abatement for a stoichiometric gasoline engine. Such favourable catalytic activity and light-off performance may be superior to that exhibited by conventional catalyst articles with the same/similar PGM specie(s), loading(s), support(s), and configuration(s). The catalyst article may be more durable in comparison to conventional catalyst articles. In other words, such favourable catalytic activity may be exhibited even after aging.

Advantageously, such superior performance may facilitate the use of lower loadings of PGMs and/or promoter metals (such as alkaline earth metals) in comparison to conventional catalyst articles without compromising catalytic performance. This may be beneficial in view of the high cost of such metals, such as palladium. Furthermore, such superior performance may facilitate the partial/complete substitution of high cost PGMs with lower cost PGMs or other transition metals without compromising catalytic performance.

Moreover, the catalyst article may provide surprisingly efficient $NO_x$ conversion performance in rich conditions. This is because the promoter-interaction of the alkaline earth metal, such as barium, and the palladium may be particularly effective in such catalyst articles.

Without wishing to be bound by theory, it is hypothesised that such superior performance may be provided by a favourable particle size distribution of the palladium nanoparticles and the nanoparticles of the sulfate of the alkaline earth metal, as well as a favourable distribution of the palladium nanoparticles and the nanoparticles of the sulfate of the alkaline earth metal relative to one another, i.e. have a high correlation with one other (in other words, having a high number of palladium-alkaline earth metal interactions by, inter alia having small particle sizes and highly evenly distributed nanoparticles, i.e. a distribution of palladium nanoparticles and the nanoparticles of the sulfate of the alkaline earth metal having high homogeneity). Without wishing to be bound by theory, it is hypothesised that the method of the present invention (e.g. the first or the second aspects), wherein the slurry that is provided in the method is disposed on a substrate, may help to enable smaller particles sizes and even distribution of the palladium and alkaline earth metal on the loaded support material and within the final support material to be formed. It is thought that this may be because, for example, there may not be an intervening step in which the prepared slurry is dried and/or fired and/or calcined before forming a further slurry to be disposed on a substrate. Without wishing to be bound by theory, it is also hypothesised that by first providing a solution comprising palladium ions, alkaline-earth-metal ions and the organic compound before mixing such a solution with any support material as in the second aspect, the interactions in solution (e.g. forming one or more complexes) may further help to enable both small particles sizes and even distribution of the palladium and alkaline earth metal on the loaded support material and within the final support material to be formed. Thus, the promoter activity of the palladium-alkaline earth metal combination may be optimised due to a higher number of interactions.

Moreover, without wishing to be bound by theory it is hypothesised that such a method may enable the particle sizes of the palladium and the alkaline earth metal sulfate to be comparable, i.e. of similar magnitude. Typically, in conventional methods, the alkaline earth metal sulfate nanoparticles may be up to 5, 10 or even 20 times greater than the palladium nanoparticles. In the methods of the present invention, since it may be possible to obtain similar-size, small nanoparticles, the interaction and correlation between the palladium and the alkaline earth metal may be high. This is because the nanoparticles may therefore be able to sit closely next to one another on the support material (if distributed evenly, for example), and enter the same sized pores in the support material, for example. Thus, a highly uniform distribution of the similarly-sized particles may be provided. This may enable the above-described advantageous effects to be achieved, but optimising the possibility for interaction between the palladium and the alkaline earth metal promotor species.

Without wishing to be bound by theory, it is also thought that such a distribution of resulting nanoparticles of the palladium and nanoparticles of the sulfate of the alkaline earth metal may help to achieve advantageous ageing properties, i.e. increased resistance to deactivity on ageing (e.g. of NOx conversion performance). This may be because due to the more even distribution of small nanoparticles that may be formed, i.e. having a relatively high number of direct palladium to alkaline earth metal interactions and a relatively low number of direct palladium to palladium and direct alkaline earth metal to alkaline earth metal interactions (i.e. with reference to neighbouring nanoparticles), on ageing such a catalyst article may be more resistant to sintering/coalescing of the particles of the same species to form larger nanoparticles thereof, thereby being deactivated. This may be due to the highly even distribution of particles enabling the nanoparticles of the "other" species to act as a physical barrier to the sintering/coalescing of nanoparticles of the same species, for example. Thus, advantageously, a catalyst article having a higher resistance to deactivation on ageing may be provided.

In contrast to the methods of the present invention, previous methods such as those described in US 2020/030780 require a pre-firing powder process, for example, in which a slurry is prepared, fired to provide a powder, followed by preparing a further slurry form the powder to be used in the washcoating process. Such an additional step may lead to a relatively larger crystallite size of $BaSO_4$ (e.g. greater than 32 nm). A further advantage may be that in situ $BaSO_4$ may form during the method, utilizing the pores of the support material (particularly for lanthanum-doped alumina) so that the growth of the $BaSO_4$ crystals is limited. Moreover, in contrast to the method of the second aspect, in which the solution comprising palladium ions, alkaline-earth-metal ions and an organic compound is provided separately, before being mixed with a support material, the methods of US 2020/030780 (which also use similar organic compounds) may not be able to achieve the above-described further advantageous effects. In US 2020/030780, the components of the washcoat slurry are each added in succession to the support material, for example. In other words, US 2020/030780 also does not disclose at least a step of providing a solution comprising palladium ions, alkaline-earth-metal ions and an organic compound. It is thought that this step may be a key factor in achieving the further advantageous effects of the second aspect.

The term "catalyst article" used herein may encompass an article in which a catalyst is supported thereon or therein. The article may take the form of, for example, a honeycomb monolith, or a filter, e.g. a wall flow filter or a flow-through filter. The catalyst article may be for use in an emission treatment system, in particular an emission treatment system for a gasoline engine, preferably a stoichiometric gasoline engine. The catalyst article may be for use in three-way catalysis.

Providing a solution comprising palladium ions, alkaline-earth-metal ions and an organic compound typically comprises contacting palladium ions, typically in the form of a palladium salt, alkaline-earth-metal ions, typically in the form of an alkaline-earth-metal salt and the organic compound with a solvent. The solvent is preferably selected such that each of the palladium ions, alkaline-earth-metal ions and organic compound have high solubility in the solvent. Providing a solution comprising palladium ions, alkaline-earth-metal ions and an organic compound typically further comprises stirring the solution for an extended period of time, such as for at least 30 minutes. Without wishing to be bound by theory, it is thought that by first providing a solution comprising palladium ions, alkaline-earth-metal ions and an organic compound, this may enable a complex comprising the palladium ions, alkaline-earth-metal ions and/or organic compound to form in the solution before being in contact with a support material. Thus, the solution is preferably does not comprise a support material and/or any solids.

The solution comprises palladium ions and alkaline-earth-metal ions. In the catalyst article manufactured by the method of the present invention, the alkaline-earth-metal species, such as an alkaline-earth-metal sulfate, may then act as a promoter for the palladium. Palladium may be particularly suitable for carrying out three-way catalysis. In addition, palladium is expensive meaning that it would be advantageous to be able to provide similar levels of catalytic activity for the same amount of metal. Furthermore, the use of palladium in the method of the present invention may result in particularly favourable perturbated light-off performance. The palladium may be in the form of an alloy. In addition to palladium ions, the solution may comprise other platinum group metals such as, for example, one or more of rhodium, platinum, ruthenium, osmium and iridium.

The support material may be any material that is capable of supporting the palladium ions, alkaline-earth-metal ions, organic compound and/or a complex formed thereof, and nanoparticles, thereon or therein. The support material may take any form, but is typically in the form of a powder, more typically a high surface area powder. When the method of the present invention is used to prepare a catalysed filter, such as a wall flow filter or flow-through filter, the support material will typically be in the form of a powder having a D50 of, for example, from 0.1 to 30 µm, more typically from 0.5 to 25 µm as measured using TEM, even more typically 1 to 20 µm. Such particle sizes may facilitate desirable rheological properties of a slurry used to coat the filter. The support material may function as a washcoat. The support material may be a washcoat or may be part of a washcoat.

The support material may also serve as an oxygen storage material, which stores and releases oxygen respectively at fuel lean and fuel rich conditions, for facilitating the three-way catalytic conversion.

Contacting the solution with the support material to form a slurry typically involves either adding the free support material to the pre-prepared solution to form a slurry thereof or contacting the pre-prepared solution with a pre-prepared slurry comprising the support material to form a slurry thereof and mixing the slurry. The term "slurry" as used herein may encompass a liquid comprising insoluble material, e.g. insoluble particles. The slurry may comprise (1) solvent; (2) soluble content, e.g. free palladium ions, free alkaline-earth-metal ions and free organic compound (i.e. outside of the support); and (3) insoluble content, e.g. supported particles with and without interactions with components of the solution. A slurry is particularly effective at disposing a material onto a substrate, in particular for maximized gas diffusion and minimized pressure drop during catalytic conversion. The slurry is typically stirred, more typically for at least 10 minutes, more typically for at least 30 minutes, even more typically for at least an hour. Increased contacting and/or stirring times may increase the amount of palladium ions, alkaline-earth-metal ions, organic compound and/or a complex formed thereof that is loaded onto the support material. The slurry therefore typically comprises a loaded support material. The term "loaded support material" as used herein may encompass a support material that has the palladium ions, alkaline-earth-metal ions, organic compound and/or a complex formed thereof loaded thereon (e.g. on the surface of a high-surface area metal oxide support material) and/or loaded therein (e.g. within the pores of a zeolite support material). The palladium ions, alkaline-earth-metal ions, organic compound and/or a complex formed thereof are typically fixed to the support, for example by electrostatic forces, hydrogen bonds, coordinate bonds, covalent bonds, and/or ionic bonds.

The term "substrate" as used herein may encompass, for example, a ceramic or metallic honeycomb, or a filter block, e.g. a wall flow filter or flow-through filter. The substrate may comprise a ceramic monolithic substrate. The substrate may vary in its material composition, size and configuration, cell shape and density, and wall thickness. Suitable substrates are known in the art.

Disposing the slurry on the substrate may be carried out using techniques known in the art. Typically, the slurry may be poured into the inlet of the substrate using a specific moulding tool in a predetermined amount, thereby disposing the loaded support material on the substrate. As discussed in more detail below, subsequent vacuum and/or air knife and/or drying steps may be employed during the disposition step. When the support is a filter block, the loaded support material may be disposed on the filter walls, within the filter walls (if porous) or both.

Heating the slurry is typically carried out in an oven or furnace, more typically a belt or static oven or furnace, typically in hot air at a specific flow from one direction. The heating may comprise calcination. The heating may also comprise drying. The drying and calcination steps may be continuous or sequential. For example, a separate washcoat may be applied after the substrate is already washcoated and dried with a previous washcoat. A washcoated substrate can also be dried and calcined using one continuous heating program if coating is completed. During the heating, any complex that may have formed in the solution may at least partially, substantially or completely decompose. In other words, the ligands of such a complex, e.g. the organic compound, are at least partially, substantially or completely removed or separated from the palladium and/or alkali earth metal, and are removed from the final catalyst article. Particles of such separated palladium may then begin to form metal-metal and metal-oxide bonds. As a result of the heating (calcination), the substrate is typically substantially free of the organic compound, more typically completely free of the organic compound. Moreover, by a similar process, it is thought that particles of a sulfate of the alkaline earth metal are formed.

The term "nanoparticle" as used herein may encompass a particle having a Rietveld crystalline size of from 0.01 nm to 100 nm as measured by XRD. The nanoparticles may be in any shape, e.g. a sphere, a plate, cubic, cylindrical, hexagonal or a rod, but are typically spherical.

Following the heating step, the substrate is typically cooled, more typically to room temperature. The cooling is typically carried out in air with or without cooling agent/media, typically without cooling agent.

After contacting the solution with the support material to form the slurry and before disposing the slurry on the substrate, the method of the second aspect preferably further comprises adding an inorganic oxide to the slurry, preferably a mixed inorganic oxide. In addition or alternatively, providing the support material may comprise providing a mixture of the support material and an inorganic oxide, preferably a mixed inorganic oxide, and contacting the solution with the support material to form a slurry comprises contacting the solution with the mixture of the support material and the inorganic oxide. In other words, in one embodiment the solution may be added to the support material (i.e. first support material), mixed, before an inorganic oxide (i.e. second support material) is added. Alternatively, in another embodiment the support material and the inorganic oxide (i.e. a first support material and a second support material) may first be mixed, and then the solution is added to the mixture of support materials. The order of these steps is not particularly limited and may depend on the support material and/or inorganic oxide that is used.

The organic compound comprises a functional group selected from a sulfo group (—$SO_3H$), a sulfonyl group (—$S(=O)_2$—) and a sulfinyl group (—$S(=O)$—). Without wishing to be bound by theory, it is thought that such a sulfur containing group may interact and/or complex with the alkaline-earth-metal ions in the solution. Moreover, it is the presence of such sulfur containing groups that enable the nanoparticles of a sulfate of the alkaline earth metal to be formed.

The organic compound preferably further comprises an amine functional group, preferably a primary amine functional group. Without wishing to be bound by theory, it is thought that such a functional group may interact with the palladium ions in the solution. Thus, the organic compound may interact and/or form complexes with both of the palladium ions and the alkaline-earth-metal ions in solution, separately or, for example, with the same molecule of the organic compound. Without wishing to be bound by theory, it is hypothesised that such interactions, if present, may help to further achieve the advantageous effects described above. That is, such interactions in the pre-formed solution may help to enable even distribution and correlation of the resulting nanoparticles of each species due to such metal ions being "held" closely together in the solution, for example, and therefore in the slurry on the loaded support material, and eventually in the final catalyst article. In this regard, the organic compound preferably comprises a sulfo group and a primary amine group.

The organic compound may comprise from 1 to 6 carbon atoms, preferably from 2 to 4 carbon atoms, more preferably 2 carbon atoms. Such organic compounds may provide a good balance between solubility in the solution, ability to form complexes with the metal species, and ability to decompose on heating to form the resulting nanoparticles of the desired size.

In particular, the organic compound preferably comprises one or more of aminomethanesulfonic acid, taurine, homotaurine, 4-aminobutane-1-sulfonic acid, 2-aminopropane-1-sulfonic acid, 2-methyltaurine, dimethyl sulfone, sulfonane, cysteic acid, dimethyl sulfoxide and aminobenzenesulfonic acid, more preferably taurine. In certain embodiments, the organic compound (e.g., taurine) and palladium can have a molar ratio of no more than 8:1; preferably, no more than 4:1. In alternative embodiments, the organic compound (e.g., taurine) and palladium can have a molar ratio of 8:1 to 2:1; preferably, 4:1 to 2:1.

In the second aspect the solution is preferably stirred before contacting the solution with the support material to form the slurry. Preferably, the solution is stirred for at least 30 minutes, more preferably for at least 1 hour, even more preferably for at least 2 hours. Without wishing to be bound by theory, it is thought that such stirring may help to evenly disperse the components of the solution and allow sufficient time to form any complexes that may form in the solution between the organic compound and one or more of the palladium ions and the alkaline-earth-metal ions, before the support material is introduced and any species formed in the solution may be loaded thereon. For example, if instead the support material is added before the alkaline earth metal ions are added to the solution, then a complex formed between the organic compound and the palladium ions may be loaded on the support material, without forming interactions with the alkaline-earth-metal ions, for example. Alternatively, if instead the support material is added before the palladium ions are added to the solution, then a complex formed between the organic compound and the alkaline-earth-metal ions may be loaded on the support material, without interacting with the palladium ions, for example. However, as described in the first aspect, a sufficiently effective method may also be provided by undertaking this alternative order of method steps.

Providing the solution and/or slurry preferably comprises contacting a solvent with a palladium salt, preferably wherein the palladium salt comprises one or more of palladium nitrate and palladium acetate, preferably palladium nitrate.

The alkaline earth metal ions preferably comprise one or more of calcium ions, strontium ions and barium ions, preferably barium ions. Barium is known to provide excellent promoter activity in combination with palladium. Providing the solution and/or slurry preferably comprises contacting a solvent with an alkaline-earth-metal salt, preferably wherein the alkaline-earth-metal salt comprises one or more of an alkaline-earth-metal hydroxide, an alkaline-earth-metal nitrate and an alkaline-earth-metal acetate, preferably an alkaline-earth-metal acetate. Preferably, the alkaline-earth-metal salt comprises barium acetate.

The solution is preferably an aqueous solution. This is in line with typical washcoating techniques in the field. Thus, in order to perform the method of the present invention, it would be simple to modify techniques and apparatuses used in conventional methods to perform the method of the present invention due to the use of similar components. The organic compound is therefore preferably highly water-soluble.

Providing the support material preferably comprises providing a first slurry comprising the support material. The first slurry preferably comprises the support material and water. As described herein, the first slurry may comprise one or more support materials and/or inorganic oxides. Thereafter, contacting the solution with the support material to form the slurry preferably comprises mixing the first slurry comprising the support material with the solution. Thus, a loaded support material may be provided as a result.

The method is preferably a one-pot method. Such a "one-pot" preparation method may be simplified and lower cost in comparison to conventional methods. It may also maximize utilization of the organic compound. Moreover, such methods avoid the need to dry and fire the slurry/suspension to make a powder before re-forming a slurry to be used in a washcoat. This, for example, is the method used in US 2020/030780. In other words, the method of the present invention preferably does not comprise drying and/or calcining the slurry before the step of disposing the slurry on the substrate.

The support material preferably comprises an oxide. The support material and/or inorganic oxide preferably comprises one or more of $Al_2O_3$, $SiO_2$, $TiO_2$, $CeO_2$, $ZrO_2$, $CeO_2$—$ZrO_2$, $V_2O_5$, $La_2O_3$ and zeolites. $Al_2O_3$ (aluminum oxide or alumina), $SiO_2$, $TiO_2$, $CeO_2$, $ZrO_2$, $CeO_2$—$ZrO_2$, $V_2O_5$, $La_2O_3$ and zeolites. The oxide is preferably a metal oxide. The support material and/or inorganic oxide more preferably comprises alumina, even more preferably gamma-alumina. The support material and/or inorganic oxide preferably comprises ceria-zirconia. The support material and/or inorganic oxide preferably comprises alumina and ceria-zirconia. The alumina and/or ceria-zirconia is preferably doped, more preferably with an oxide of one or more of lanthanum, neodymium, yttrium, niobium, praseodymium, hafnium, molybdenum, titanium, vanadium, zinc, cadmium, manganese, iron, copper, calcium, barium, strontium, caesium, magnesium, potassium, or sodium; even more preferably with an oxide of lanthanum, neodymium or yttrium. Such doped oxides are particularly effective as support materials. Preferably, the dopant is present in the alumina and/or ceria-zirconia in an amount of from 0.001 wt. % to 20 wt. %, and more preferably from 0.5 wt. % to 10 wt. %.

The support material preferably comprises alumina, preferably lanthanum-doped alumina, and the inorganic oxide comprises an inorganic oxide other than alumina, preferably ceria zirconia.

The support material and/or inorganic oxide is preferably in the form of a powder having a D90 of from 0.1 to 25 μm, preferably from 0.5 to 5 μm, measured by TEM.

Before disposing the slurry on the substrate, one or more of a binder; an acid or a base; and a thickening agent may be added to the solution and/or slurry.

Binders may include, for example, an oxide material with small particle size to bind the individual insoluble particles together in washcoat slurry. The use of binders in washcoats is well known in the art.

Thickening agents may include, for example, a natural polymer with functional hydroxyl groups that interacts with insoluble particles in washcoat slurry. It serves the purpose of thickening washcoat slurry for the improvement of coating profile during washcoat coating onto substrate. It is usually burned off during washcoat calcination. Examples of specific thickening agents/rheology modifiers for washcoats include glactomanna gum, guar gum, xanthan gum, curdlan schizophyllan, scleroglucan, diutan gum, Whelan gum, hydroxymethyl cellulose, carboxymethyl cellulose, hydroxyethyl cellulose, methyl cellulose, methyl hydroxyethyl cellulose, methyl hydroxypropyl cellulose and ethyl hydroxycellulose.

The method preferably comprises washcoating. Suitable washcoating techniques are known to the skilled person.

The slurry preferably has a solids content of from 10 to 40%, preferably from 15 to 35%. Such a solids content may enable slurry rheologies suitable for disposing the loaded support material onto the substrate. For example, if the substrate is a honeycomb monolith, such solid contents may enable the deposition of a thin layer of washcoat onto the inner walls of the substrate. If the substrate is a wall flow filter, such solids contents may enable the slurry to enter the channels of the wall flow filter and may enable the slurry to enter the walls of the wall flow filter.

Disposing the slurry on the substrate preferably comprises contacting the slurry with the substrate and optionally: applying a vacuum to the substrate, and/or drying the slurry on the substrate. This may result in a favourable distribution of the loaded support material that may be contained in the slurry on the substrate. The drying preferably occurs at a temperature of from 60° C. to 200° C., more preferably from 70° C. to 130° C.; and/or for from 10 to 360 minutes, preferably from 15 to 60 minutes.

The substrate preferably comprises cordierite. The substrate may be in the form of a honeycomb monolith, a wall flow filter or a flow through filter. The substrate may be a "blank", i.e. un-washcoated, substrate. Alternatively, the substrate may have one or washcoats already loaded thereon. In such a situation, the final catalyst article may comprise multiple layers of different washcoats.

The heating is preferably carried out: at a temperature of from 400° C. to 700° C., preferably from 400° C. to 600° C., more preferably from 450° C. to 600° C.; and/or for from 10 to 360 minutes, preferably from 35 to 120 minutes. The heating preferably comprises calcining.

The palladium nanoparticles preferably have a Rietveld crystallite size of from 0.1 nm to 20 nm, preferably from 5 to 15 nm. The crystallite size may be measured by X-ray diffraction (XRD). Such particle sizes may advantageously enable the favourable properties discussed above, such as high activity and resistance to deactivation upon ageing.

The alkaline earth metal sulfate nanoparticles preferably have a Rietveld crystallite size of from 0.1 nm to 30 nm, preferably from 5 to 25 nm, more preferably from 5 to 20 nm or 10 to 20 nm, even more preferably from 12 to 16 nm. The crystallite size may be measured by XRD. Such particle sizes may advantageously enable the favourable properties discussed above, such as high activity and resistance to deactivation upon ageing. Moreover, such sizes of the nanoparticles, in combination with those preferred for the palladium nanoparticles, may help to achieve the advantageous properties described above as a result of the comparable particle sizes.

Unless otherwise described herein, any crystallite size described herein may be measured by XRD. Suitable techniques are known in the art. For example, such a technique may be described as follows. To acquire the X-ray diffraction data, an X'Pert Pro MPD diffractometer can be used with the BraggBrentano$^{HD}$ mirror, ¼° divergent slit, 20 mm mask, sample spinner, and the PIXcel detector. A triplicate scan can be performed over the range 5° to 115°, a 0.02° step size, and a 50 min total scan time. The data can be analyzed using the HighScore Plus software. The transition alumina phase can be modeled using partial or not known crystal structure method (N. V. Y. SCARLETT and I. C. MADSEN, Quantification of phases with partial or not known crystal structure, Powder Diffraction (2006), 21(4), 278-284, which is incorporated herein by reference) and all other phases can be modeled using Rietveld. Crystallite size and strain can be measured based on the Pseudo-Voigt profile function and can be corrected for instrument broadening. Crystallite size measured by XRD is a common parameter for determining nanoparticle sizes of such species in the field of the present invention.

Preferably, M=C±70%, preferably M=C±50%, more preferably M=C±30%, even more preferably M=C±20%, M being the Rietveld crystallite size of the Pd nanoparticles and C being the Rietveld crystallite size of the alkaline earth metal sulfate nanoparticles. In other words, the Rietveld crystallite size of the Pd nanoparticles and the Rietveld crystallite size of the alkaline earth metal sulfate nanoparticles are preferably comparable in size, i.e. of a similar magnitude, for the reasons described above.

In a further aspect, the present invention provides a catalyst article for use in an emissions treatment system, the catalyst article comprising: a substrate; and a first catalytic region on the substrate; wherein the first catalytic region comprises a support material, palladium nanoparticles and alkaline earth metal sulfate nanoparticles; and wherein the alkaline earth metal sulfate nanoparticles have a Rietveldcrystallite size of from 0.1 nm to 30 nm.

In comparison to conventional catalyst articles, such a catalyst article may exhibit favourable light-off performance, in particular for NO, CO and total hydrocarbons during three-way catalytic conversions for stoichiometric gasoline emissions abatement. The catalyst article may also exhibit the other favourable properties described herein, such as high resistance to deactivation on ageing, and high activity, such as NOx conversion performance in rich conditions.

The palladium nanoparticles preferably have a crystallite size of from 0.1 to 20 nm. The palladium nanoparticles preferably have a Rietveld crystallite size of from 5 nm to 15 nm.

Preferably, M=C±70%, preferably M=C±50%, more preferably M=C±30%, even more preferably M=C±20%, M being the crystallite size of the Pd nanoparticles and C being the crystallite size of the alkaline earth metal sulfate nanoparticles.

Preferably, when a cross section of the first catalytic region of the catalyst article is subjected to area analysis by FE-EPMA under conditions of pixel (section) size of 0.34 μm×0.34 μm and number of measured pixels (sections) of 256×256, a characteristic X-ray intensity (α: cps) of the alkaline earth metal element (Ae) and a characteristic X-ray intensity (β: cps) of the palladium (Pd) are measured for each pixel, and the Pearson correlation coefficient calculated using the resulting α and β in each pixel is designated as $R_{Ae/Pd}$, then the value of $R_{Ae/Pd}$ is at least 0.75. The Pearson correlation coefficient (product moment correlation coefficient) is known to the skilled person and is calculated based on the results of area analysis by FE-EPMA. The correlation coefficient $R_{Ae/Pd}$ is determined by the formula: $R_{Ae/Pd}$=(covariance)/(standard deviation of α×standard deviation of β), wherein the first variable (α) is a characteristic X-ray intensity of the alkaline earth metal element (Ae) and the second variable (β) is a characteristics X-ray intensity of the palladium (Pd) in area analysis by FE-EPMA. Such a calculation is known to the skilled person. In other words, preferably, the alkaline earth metal element and the palladium are highly correlated in such a catalyst article. That is, the alkaline earth metal may be present in a highly dispersed state with reference to the distribution of the palladium on the substrate. Thus, the ability of the alkaline earth metal to act as a promoter species for the palladium may be optimised.

In a further aspect, the present invention provides a catalyst article for use in an emissions treatment system, the catalyst article comprising: a substrate; and a first catalytic region on the substrate; wherein the first catalytic region comprises a support material, palladium nanoparticles and alkaline earth metal sulfate nanoparticles; and wherein when a cross section of the first catalytic region of the catalyst article is subjected to area analysis by FE-EPMA under conditions of pixel (section) size of 0.34 μm×0.34 μm and number of measured pixels (sections) of 256×256, a characteristic X-ray intensity (α: cps) of the alkaline earth metal element (Ae) and a characteristic X-ray intensity (β: cps) of the palladium (Pd) are measured for each pixel, and the Pearson correlation coefficient calculated using the resulting α and β in each pixel is designated as $R_{Ae/Pd}$, then the value of $R_{Ae/Pd}$ is at least 0.75. The Pearson correlation coefficient (product moment correlation coefficient) is known to the skilled person and is calculated based on the results of area analysis by FE-EPMA. The correlation coefficient $R_{Ae/Pd}$ is determined by the formula: $R_{Ae/Pd}$=(covariance)/(standard deviation of α×standard deviation of β), wherein the first variable (α) is a characteristic X-ray intensity of the alkaline earth metal element (Ae) and the second variable (β) is a characteristics X-ray intensity of the palladium (Pd) in area analysis by FE-EPMA. Such calculation are known to the skilled person. In other words, preferably, the alkaline earth metal element and the palladium are highly correlated in such a catalyst article. That is, the alkaline earth metal may be present in a highly dispersed state with reference to the distribution of the palladium on the substrate. Thus, the ability of the alkaline earth metal to act as a promoter species for the palladium may be optimised.

Preferably, $R_{Ae/Pd}$ is at least 0.76. In other words, the alkaline earth metal and palladium are preferably highly correlated. Such high correlation may not be easily achieved with the larger alkaline-earth-metal sulfate nanoparticles of conventional catalyst articles, i.e. those having small palladium nanoparticles, but much larger alkaline-earth-metal sulfate nanoparticles.

Preferably, the palladium nanoparticles have a Rietveld crystallite size of no more than 60 nm and/or any alkaline-earth-metal-containing species have a Rietveld crystallite size of no more than 50 nm after ageing at 1000° C. for 100 hours, preferably wherein the palladium nanoparticles have a Rietveld crystallite size of no more than 40 nm and/or any alkaline-earth-metal-containing species have a Rietveld crystallite size of no more than 30 nm after ageing at 1000° C. for 100 hours.

The alkaline earth metal preferably comprises one or more of calcium, strontium and barium, preferably barium.

The first catalytic region preferably further comprises an inorganic oxide, preferably a mixed inorganic oxide, more preferably ceria-zirconia.

The catalyst article may be obtainable by the methods described herein.

The catalyst article is preferably for use in an emission treatment system.

The catalyst article is preferably for three-way catalysis.

The catalyst article preferably has a total loading of support material, palladium nanoparticles, alkaline earth metal sulfate nanoparticles and optionally inorganic oxide of from 1 g/in³ to 3 g/in³.

In some embodiments, the catalyst article can have a Pd loading of 20-150 g/ft³; preferably, 40-120 g/ft³; more preferably, 80-120 g/ft³. Alternatively, the catalyst article can have a Pd loading of no more than 150 g/ft³; preferably, no more than 120 g/ft³; more preferably, no more than 100 g/ft³.

The substrate preferably comprises a wall flow filter substrate. The substrate preferably comprises a flow-through substrate.

The catalyst article preferably comprises a first catalytic region and a second catalytic region; wherein the first catalytic region comprises a support material, palladium nanoparticles and alkaline earth metal sulfate nanoparticles; and wherein the second catalytic region comprises platinum and/or rhodium.

Preferably, the first catalytic region forms a first layer on the substrate and the second catalytic region forms a second layer on the substrate, the first layer extending from a first end of the substrate and the second layer extending from a second end of the substrate, preferably wherein first and second catalytic regions are each disposed directly onto the substrate.

Preferably, the catalyst article further comprises a third catalytic region, wherein the second catalytic region comprises platinum; and optionally wherein the third catalytic region comprises rhodium and is disposed on top of the first catalytic region and/or the second catalytic region such that the first and/or second catalytic regions are each located between the third catalytic region and the substrate.

In another preferred embodiment, the first catalytic region forms a first layer on the substrate and the second catalytic region forms a second layer on the substrate, the first layer being disposed directly onto the substrate and the second layer being disposed directly onto the first layer. In another preferred embodiment, the first catalytic region forms a first layer on the substrate and the second catalytic region forms a second layer on the substrate, the second layer being disposed directly onto the substrate and the first layer being disposed directly onto the first layer. In another preferred embodiment, the catalyst article further comprises a third catalytic region, wherein the third catalytic region is disposed directly onto the first or second layer, optionally wherein the second catalytic region comprises platinum and the third catalytic region comprises rhodium.

In other words, a catalyst article comprising a catalytic region formed by the method of the invention may have such a catalyst layer as a top, middle or bottom layer, for example. The term "bottom layer" as used herein may encompass a layer (e.g. washcoat layer) that is closest to or in contact with the substrate (i.e. substrate walls). The term "top layer" as used herein may encompass a layer (e.g. a washcoat layer) that is more remote from the substrate (i.e. substrate walls) than the bottom layer, and may be situated on top of the bottom layer. In such layered catalyst articles, the top and/or bottom layer of support material may have a further PGM thereon, for example platinum. In such layered catalyst articles, the top and/or bottom layer may comprise multiple PGMs, i.e. may be bimetallic (e.g. contain Pd—Rh or Pd—Pt) or trimetallic (e.g. Pd—Rh—Pt). The catalyst article may comprise two or more catalyst zones, for example an upstream zone and a downstream zone. The zones may differ from each other by having different PGMs (e.g. Rh upstream and Pd downstream or vice versa) or differing by the amount of different type PGMs e.g. monometallic, bimetallic or trimetallic.

In any of the above preferred embodiments, the first, second and/or third catalytic regions may be in the form of zones, such zones covering less than 100% of the substrate, such as 90% or less, 80% or less, 70% or less, 60% or less, 50% or less, 40% or less, 30% or less, 20% or less, or 10% or less. The zone may extend from the inlet end or the outlet end of the substrate.

The substrate may have a first end and a second end with an axial length L.

The first catalytic region can extend for 100 percent of the axial length L. (E.g., see FIGS. 1, 2a, 2b, and 6a-6c). In some embodiments, the first catalytic region can extend for 20 to 99%, 30 to 90%, or 40-80% of the axial length L. Alternatively, the first catalytic region can extend for 30 to 70 percent of the axial length L. Preferably, for 40 to 60 percent, more preferably, 45 to 55 percent of the axial length L, (E.g., see FIGS. 3a-5d and 7a-7l).

The second catalytic region can extend for 100 percent of the axial length L. (E.g., see FIGS. 2a, 2b, and 6a-6c)

The second catalytic region can extend for 30 to 70 percent of the axial length L. Preferably, for 40 to 60 percent, more preferably, 45 to 55 percent of the axial length L. and most preferably, the total length of the second region and the first region is equal or greater than the axial length L (E.g., see FIGS. 3a-5d and 7a-7l).

Figure 3A:
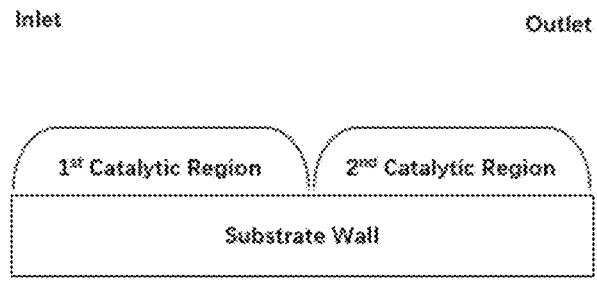
FIG. 3a shows one embodiment according to the present invention, the first catalytic region extends less than 100% of the axial length L, from the inlet end; the second catalytic region extends less than 100% of the axial length L, from the outlet end. The total length of the second and the first catalytic region is equal or less than the axial length L.
Figure 3B:
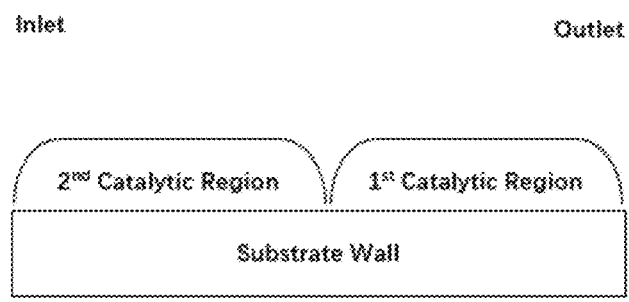
Figure 3C:
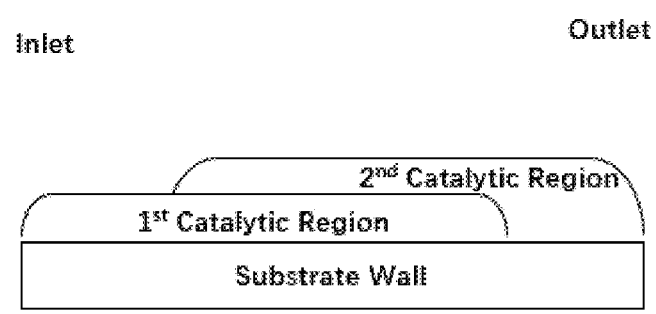
FIG. 3c shows one embodiment according to the present invention, the first catalytic region extends less than 100% of the axial length L, from the inlet end; the second catalytic region extends less than 100% of the axial length L, from the outlet end. The total length of the second and the first catalytic region is greater than the axial length L.
Figure 3D:
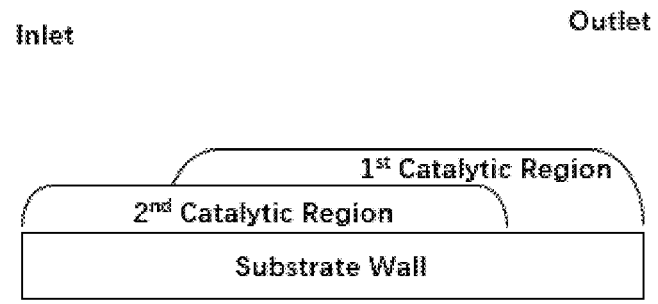
FIG. 3d depicts a variation of FIG. 3c.
Figure 4A:
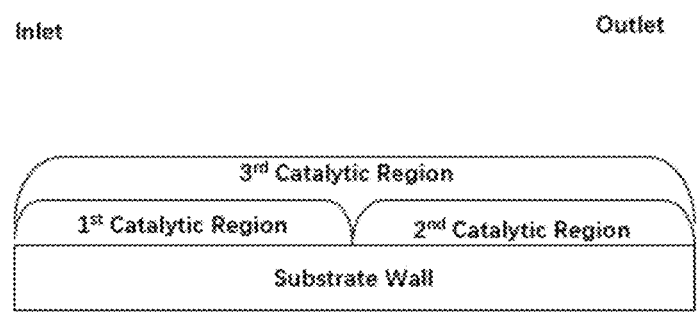
FIG. 4a shows one embodiment according to the present invention, the first catalytic region extends less than 100% of the axial length L, from the inlet end; the second catalytic region extends less than 100% of the axial length L, from the outlet end. The total length of the second and the first catalytic region is less than or equal to the axial length L. The $3^{rd}$ catalytic region extends 100% of the axial length L and overlies the first and second catalytic regions as top layer.
Figure 4B:
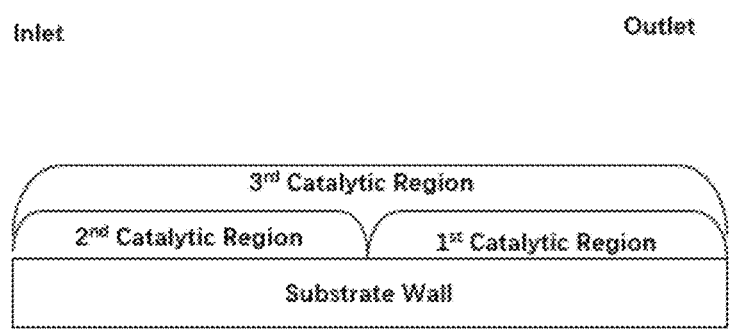
Figure 4C:
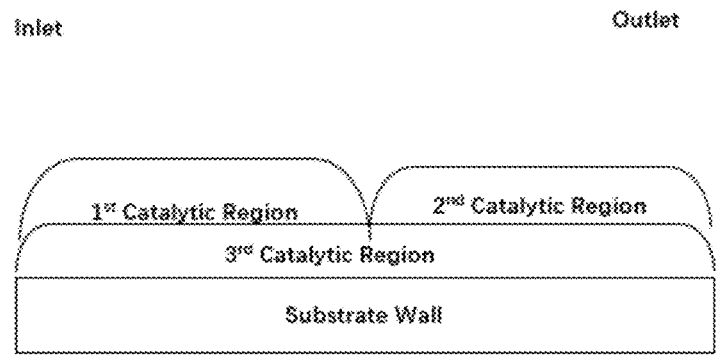
FIG. 4c shows one embodiment according to the present invention, the $3^{rd}$ catalytic region extends 100% of the axial length L as bottom layer. The first catalytic region extends less than 100% of the axial length L, from the inlet end; the second catalytic region extends less than 100% of the axial length L, from the outlet end. The total length of the second and the first catalytic region is less than or equal to the axial length L.
Figure 4D:
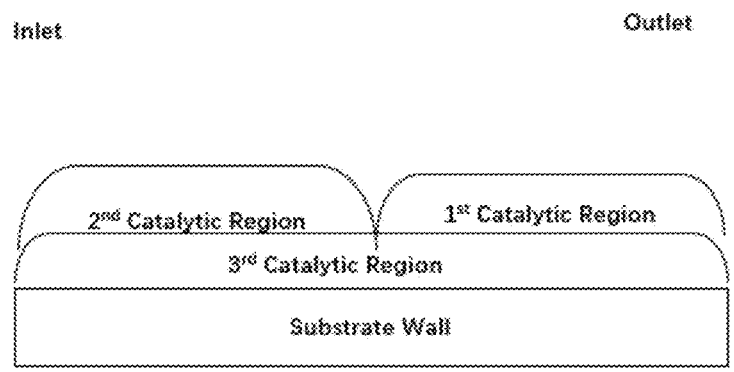
FIG. 4d depicts a variation of FIG. 4c.
Figure 5A:
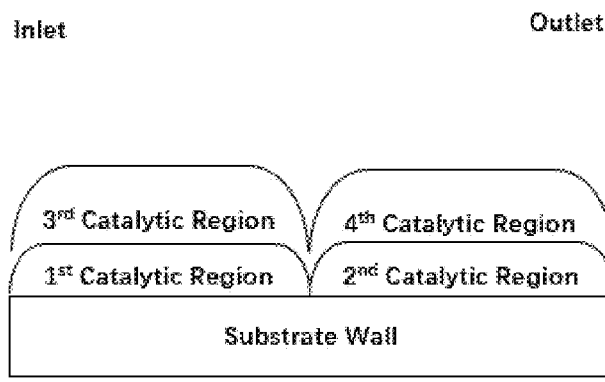
FIG. 5a shows one embodiment according to the present invention, the first catalytic region extends less than 100% of the axial length L, from the inlet end; the second catalytic region extends less than 100% of the axial length L, from the outlet end. The total length of the second and the first catalytic region can be less than, equal to, or greater than the axial length L. The third catalytic region extends less than 100% of the axial length L, from the inlet end; the fourth catalytic region extends less than 100% of the axial length L, from the outlet end. The total length of the third and the fourth catalytic region can be less than, equal to, or greater than the axial length L. The first and second catalytic regions constitutes bottom layer; and the third and fourth catalytic regions constitutes top layer.
Figure 5B:
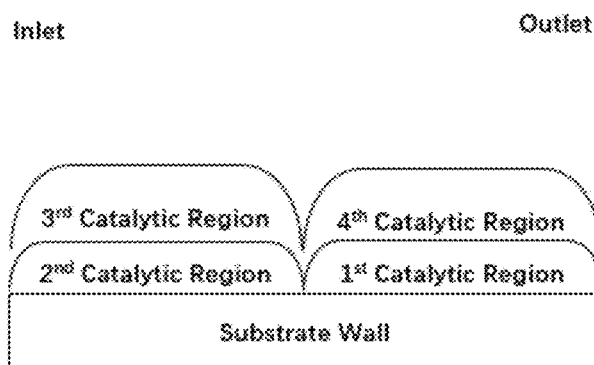
Figure 5C:
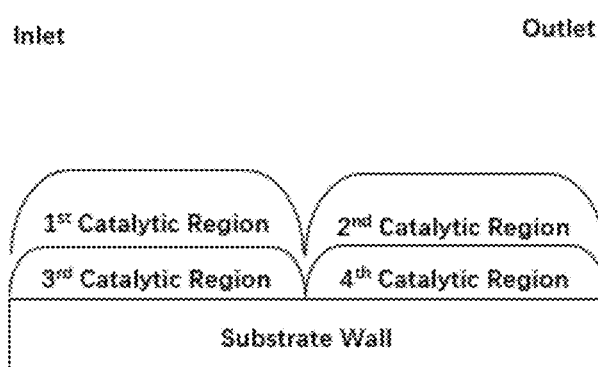
Figure 5D:
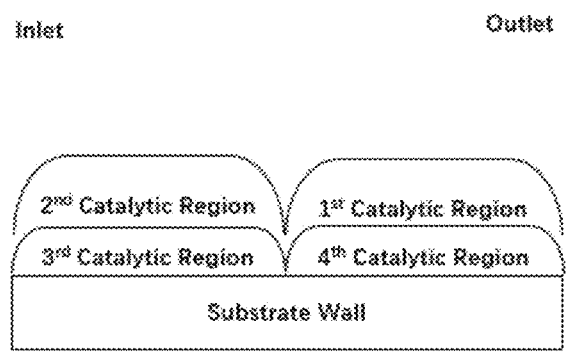
Figure 6A:
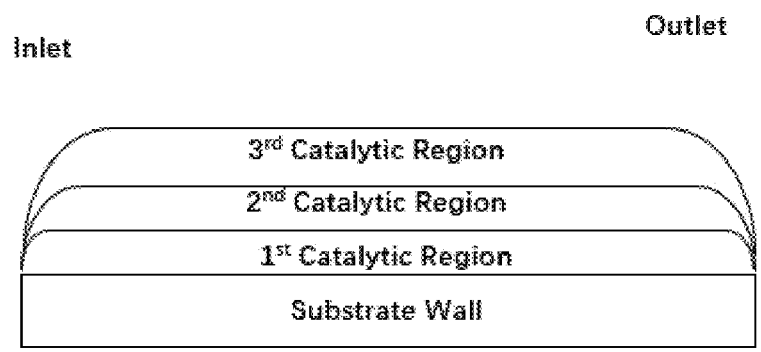
FIG. 6a shows one embodiment according to the present invention, the first catalytic region extends 100% of the axial length L, as bottom layer; the second catalytic region extends 100% of the axial length L, as middle layer; and the third catalytic region extends 100% of the axial length L, as top layer.
Figure 6B:
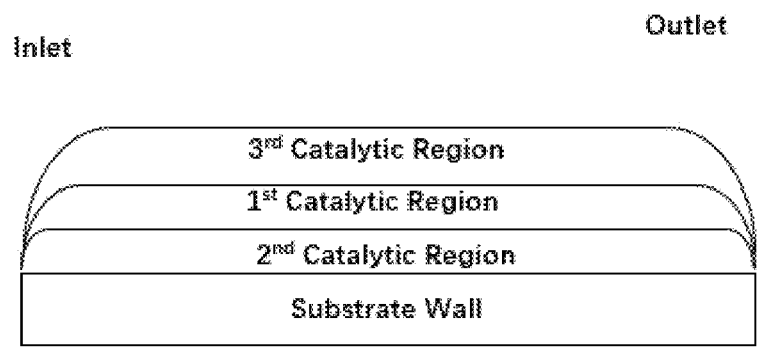
Figure 6C:
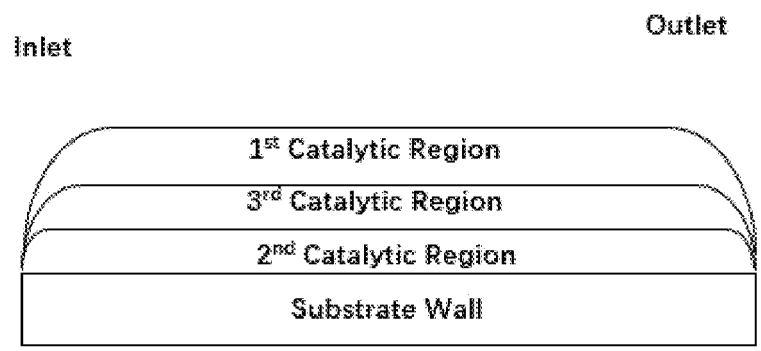
Figure 7A:
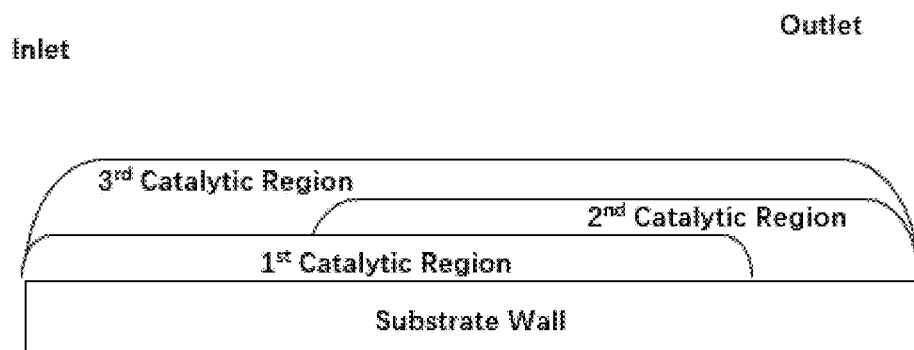
FIG. 7a shows one embodiment according to the present invention, the first catalytic region extends less than 100% of the axial length L, from the inlet end; the second catalytic region extends less than 100% of the axial length L, from the outlet end. The total length of the second and the first catalytic region is greater than the axial length L. The $3^{rd}$ catalytic region extends 100% of the axial length L and overlies the first and second catalytic regions as top layer.
Figure 7B:
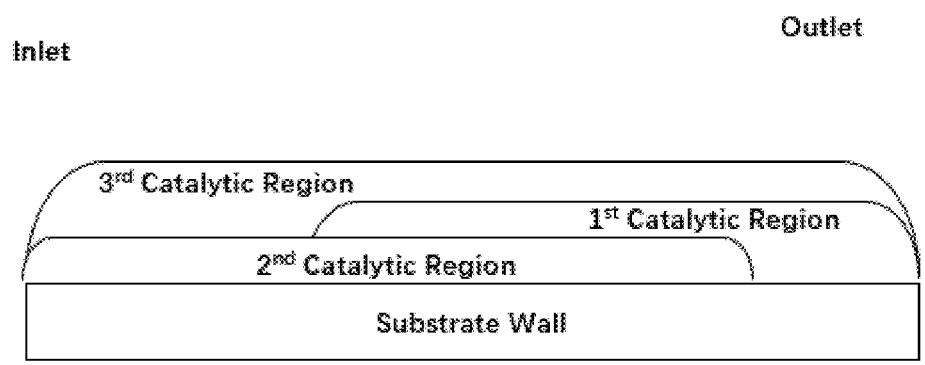
Figure 7C:
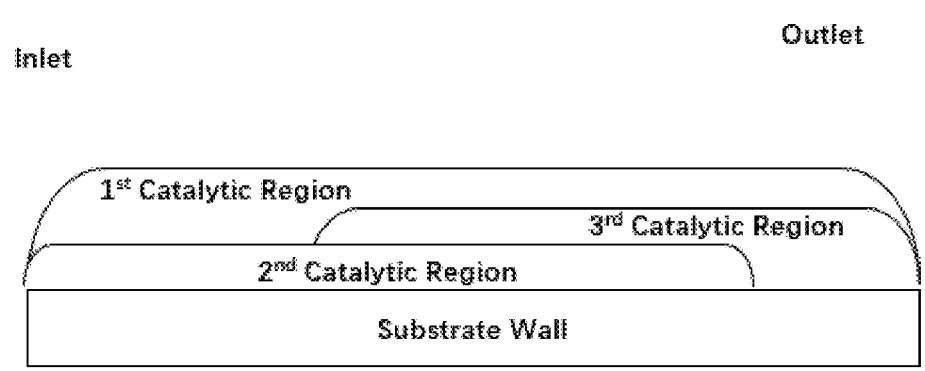
Figure 7D:
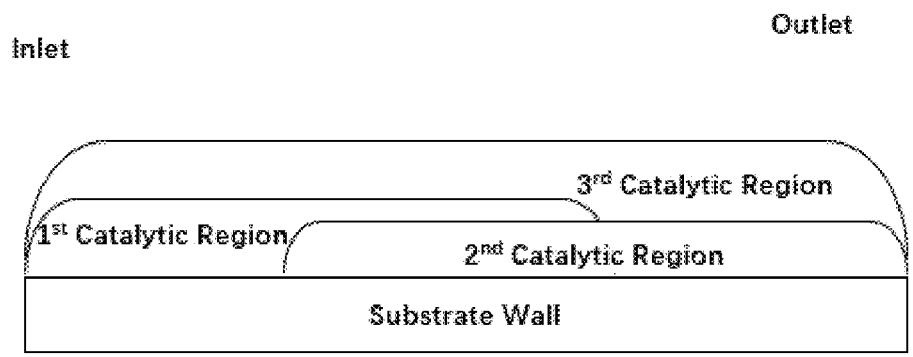
Figure 7E:
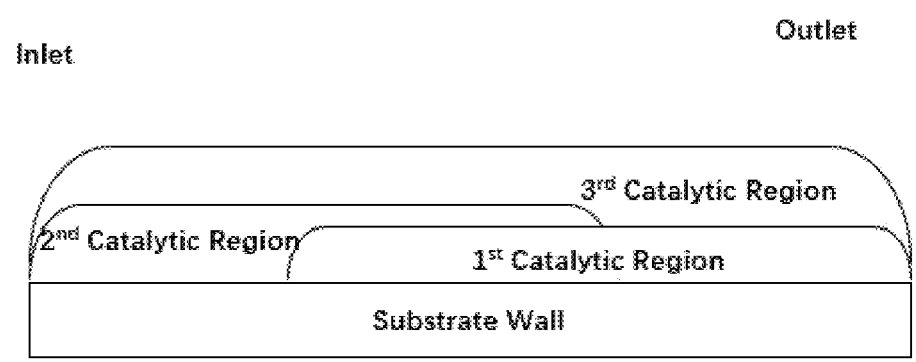
Figure 7F:
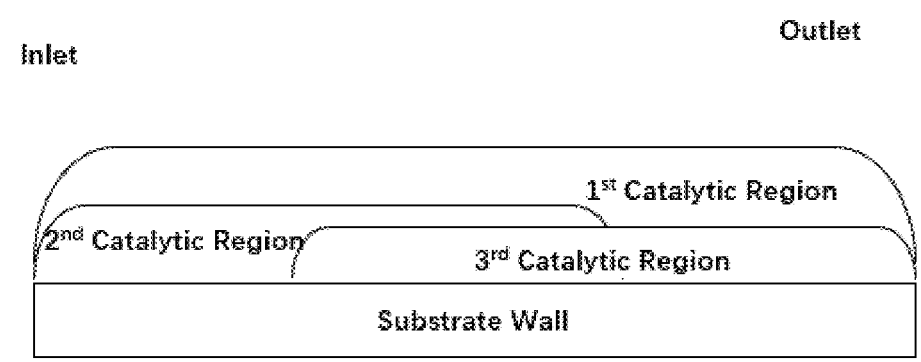
Figure 7G:
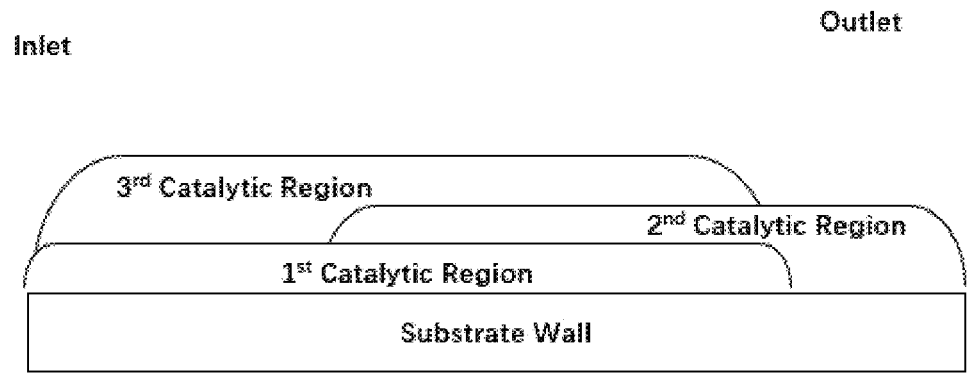
FIG. 7g shows one embodiment according to the present invention, the first catalytic region extends less than 100% of the axial length L, from the inlet end; the second catalytic region extends less than 100% of the axial length L, from the outlet end. The total length of the second and the first catalytic region can be less than, equal to, or greater than the axial length L. The $3^{rd}$ catalytic region extends less than 100% of the axial length L from the inlet end and at least partially overlies the first and/or second catalytic regions.
Figure 7H:
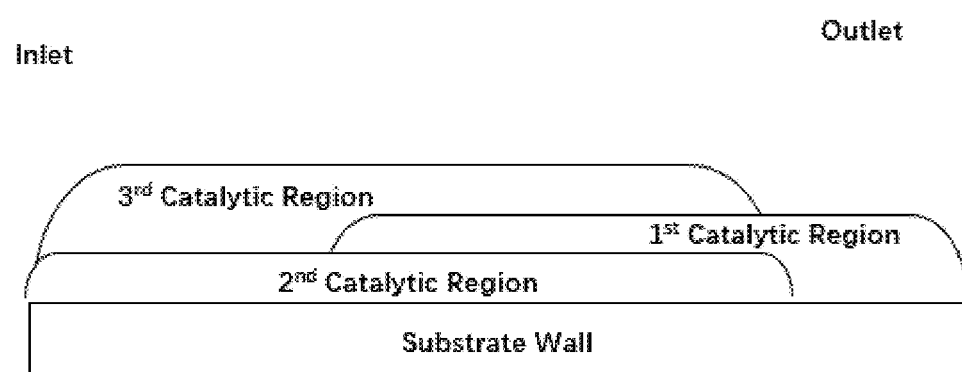
FIGS. 7h and 7i depict variations of FIG. 7g.
Figure 7I:
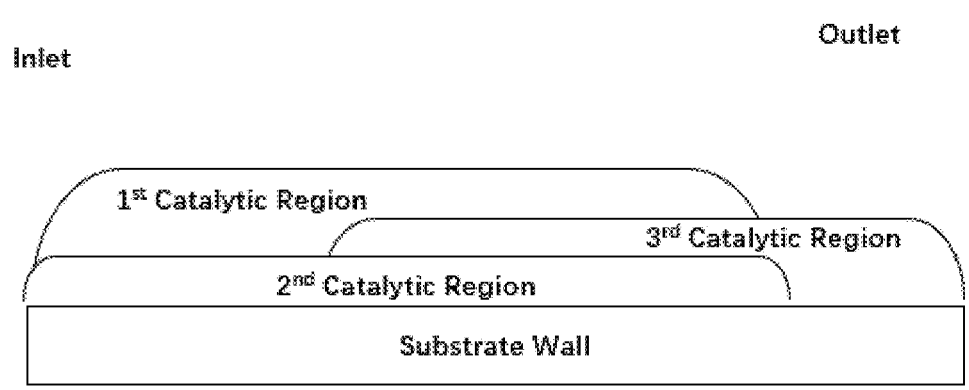
Figure 7J:
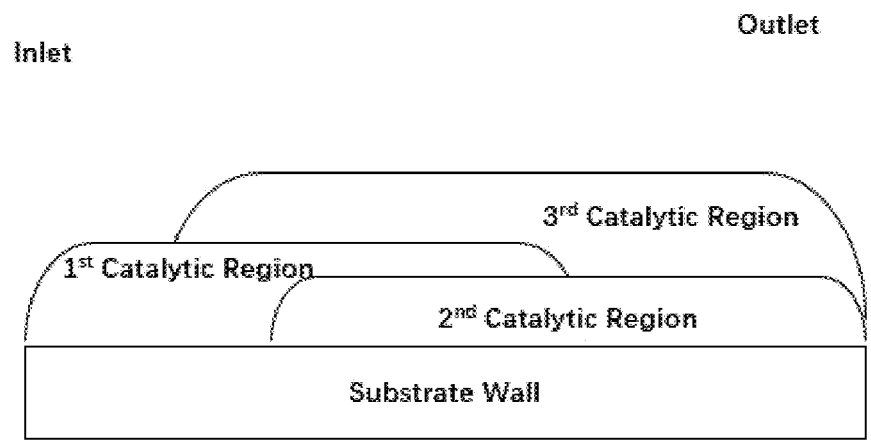
FIG. 7j shows one embodiment according to the present invention, the first catalytic region extends less than 100% of the axial length L, from the inlet end; the second catalytic region extends less than 100% of the axial length L, from the outlet end. The total length of the second and the first catalytic region can be less than, equal to, or greater than the axial length L. The $3^{rd}$ catalytic region extends less than 100% of the axial length L from the outlet end and at least partially overlies the second and/or first catalytic regions.
Figure 7K:
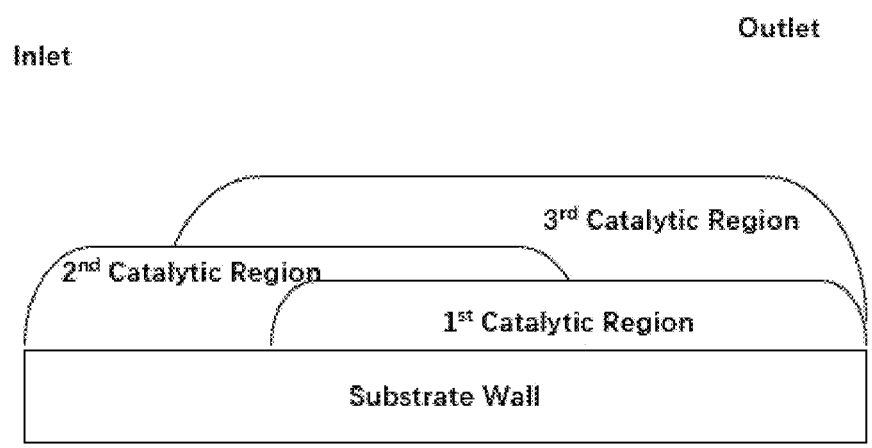
FIGS. 7k and 7l depict variations of FIG. 7j.
Figure 7L:
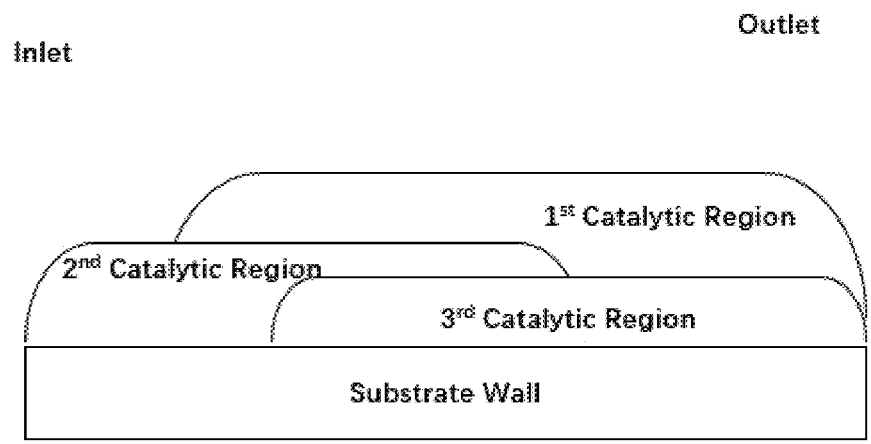

The second catalytic region can overlap with the first catalytic region for 0.1 to 99 percent of the axial length L (e.g., see FIGS. 3c and 3d, the first catalytic region can overlie the second catalytic region or the second catalytic region can overlie the first catalytic region). Alternatively, the total length of the second catalytic region and the first catalytic region can equal to the axial length L (e.g., see FIGS. 3a and 3b). In yet another alternative, total the length of the second catalytic region and the first catalytic region can be less than the axial length L, for example, no greater than 95%, 90%, 80%, or 70% of the axial length L.

The third catalytic region can extend for 100 percent of the axial length L (e.g., see FIGS. 4a-4d and 6a-6c).

The third catalytic region can be less than the axial length L, for example, no greater than 95%, 90%, 80%, or 70% of the axial length L (e.g., see FIGS. 5a-5d and 7g-7l).

The second catalytic region can overlap with the first catalytic region for 0.1 to 99 percent of the axial length L (e.g., see FIGS. 7a-7l), the first catalytic region can overlie the second catalytic region, or the second catalytic region can overlie the first catalytic region). Alternatively, the either of second or first region can extend for 30 to 70 percent of the axial length L. Preferably, for 40 to 60 percent, more preferably, 45 to 55 percent of the axial length L. and most preferably, the total length of the second and the first region is equal or less than the axial length L (e.g., see FIGS. 4a-4d).

The support material preferably comprises alumina and/or ceria-zirconia, preferably alumina. The alumina preferably comprises a doped-alumina, preferably lanthanum-doped alumina.

The catalyst article preferably comprises from 10 g/ft$^3$ to 250 g/ft$^3$ palladium, preferably from 20 g/ft$^3$ to 150 g/ft$^3$ palladium. Advantageously, such palladium levels may be lower than those of conventional catalyst articles but without compromising catalytic activity.

In a further aspect, the present invention provides an emission treatment system comprising the catalyst article described herein.

The emission treatment system is preferably for a gasoline engine.

The gasoline engine preferably operates under stoichiometric conditions.

In a further aspect, the present invention provides a method of treating an exhaust gas, the method comprising: providing the catalyst article described herein; and contacting the catalyst article with an exhaust gas.

The exhaust gas is preferably from a gasoline engine. The catalyst article is particularly suitable for treating such exhaust gas. Moreover, exhaust from a gasoline engine is typically harsher than that from a diesel engine. Therefore, the advantageous ageing properties of the catalyst articles described herein are particularly beneficial therefor. The gasoline engine preferably operates under stoichiometric conditions.

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g. region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:

(a) nearer to an inlet end (e.g. open end) of an inlet channel of the substrate than the zone is to a closed end (e.g. blocked or plugged end) of the inlet channel, and/or (b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:

(a) nearer to an outlet end (e.g. an open end) of an outlet channel of the substrate than the zone is to a closed end (e.g. blocked or plugged) of the outlet channel, and/or (b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

Any reference to an amount of dopant, particularly a total amount, expressed as a % by weight as used herein refers to the weight of the support material or the refractory metal oxide thereof.

The term "loading" as used herein refers to a measurement in units of $g/ft^3$ on a metal weight basis.

Where the present specification refers to "a" or "an", this encompasses the singular and plural forms.

The following non-limiting examples merely illustrate the invention. Those skilled in the art will recognize many variations that are within the spirit of the invention and scope of the claims.

A number of catalyst articles were prepared according to the following examples. In particular, a number of catalyst articles were prepared wherein each method required a different order of addition of the components of the washcoat in order to demonstrate the surprising results of the present invention.

Reference Catalyst 1—Standard Washcoat (No Taurine)

Bottom Layer Front Zone Washcoat Slurry was Prepared by:
  (i) milling and making a slurry containing a ceria and zirconia mixed oxide,
  (ii) adding barium acetate and palladium nitrate to the slurry (i) above,
  (iii) adding milled 4% $La_2O_3$ doped alumina to the mixed slurry (ii) above, and
  (iv) thickening the washcoat (iii) with rheology modifier.

The final compositions of the bottom layer front zone washcoat contained ceria zirconia composite 1.6 $g/in^3$, 4% $La_2O_3$-doped alumina 0.7 $g/in^3$, Ba element 300 $g/ft^3$, and Pd element 98 $g/ft^3$.

Bottom Layer Rear Zone Washcoat Slurry was Prepared by:
  (i) milling and making a slurry containing 4% $La_2O_3$ doped alumina,
  (ii) adding platinum nitrate to the slurry (i) for mixing,
  (iii) milling a ceria and zirconia mixed oxide.
  (iv) blending the two slurries (ii) and (iii) above.
  (v) thicken the washcoat (iv) with rheology modifier.

The final compositions of the bottom layer rear zone washcoat contained ceria zirconia composite 1.6 $g/in^3$, 4% $La_2O_3$-doped alumina 0.7 $g/in^3$ and Pt element 98 $g/ft^3$.

Top Layer Washcoat was Prepared by:
  (i) milling and making a slurry containing a ceria and zirconia mixed oxide,
  (ii) adding rhodium nitrate solution to the slurry (i),
  (iii) adjusting pH of the slurry (ii) to precipitate Rh onto mixed oxide,
  (iv) adding milled 4% $La_2O_3$ doped alumina to the slurry (iii),
  (v) thickening the washcoat (iv) with rheology modifier.

The final compositions of the top layer washcoat contained ceria zirconia composite 1.0 $g/in^3$, 4% $La_2O_3$-doped alumina 0.35 $g/in^3$ and Rh element 2 $g/ft^3$.

Washcoat Coating on a Follow Through Substrate:
  (i) Use precision coating method with the rear zone dose first to 50%-55% dose length. Dry to 80% or greater moisture removal.
  (ii) Coat the front zone washcoat to a 50%-55% dose length target. Dry to 80% or greater moisture removal.
  (iii) Calcine.
  (iv) Apply the top layer by precision coating method targeting 50% to 55% dose length. Drying to 80% moisture removal or greater in between inlet and outlet doses.
  (v) Calcine.

Reference Catalyst 2—Pre-Fired Powder Containing Pd, $BaSO_4$ and Support Material Bottom Layer Front Zone Washcoat Slurry was Prepared by:
  (i) milling and making a slurry containing 4% $La_2O_3$ doped alumina,
  (ii) adding Pd nitrate solution to the stirring slurry above,
  (iii) adding Ba Acetate to the stirring slurry (ii) above,
  (iv) adding taurine to the stirring slurry (iii) above.

(v) drying the slurry (iv) at 110° C. in air overnight, Calcining at 500° C. for 2 hours,
(vi) grinding, sieving, and making a slurry of the pre-fired powder from (v),
(vii) milling and making a slurry a ceria and zirconia mixed oxide,
(viii) mixing the slurries from (vi) and (vii) together to form washcoat slurry, and
(ix) thickening the washcoat slurry in (viii) with rheology modifier.

The final compositions of the pre-fired powder (v) contained 8.1% Pd element and 24.5% Ba element on 4% Lanthanide-doped alumina. The final compositions of the washcoat are ceria zirconia composite 1.6 g/in$^3$, 4% La$_2$O$_3$-doped alumina 0.7 g/in$^3$, Ba metal 300 g/ft$^3$, and Pd metal 98 g/ft$^3$.

The bottom layer rear zone washcoat slurry for Reference Catalyst 2 and the top layer washcoat for Reference Catalyst 2 were prepared in the same way as for Reference Catalyst 1, respectively.

Washcoat coating application was the same as for Reference Catalyst 1.

Inventive Catalyst 1—Taurine Direct Batch Addition
Bottom Layer Front Zone Washcoat Slurry was Prepared by:
(i) milling and making a slurry containing a ceria and zirconia mixed oxide,
(ii) milling and making a slurry containing 4% La$_2$O$_3$ doped alumina slurry in a separate container,
(iii) blending the two slurries (i) and (ii) above together with continuous mixing,
(iv) adding palladium nitrate to the slurry (iii) above and mixing,
(v) adding Ba Acetate to the slurry (iv) above and mixing,
(vi) adding taurine to the slurry (v) above and mixing,
(vii) thickening the washcoat slurry in (vi) with rheology modifier.

The final compositions of the bottom layer front zone washcoat contained ceria zirconia composite 1.6 g/in$^3$, 4% La$_2$O$_3$-doped alumina 0.7 g/in$^3$, Ba metal 300 g/ft$^3$, and Pd metal 98 g/ft$^3$.

The bottom layer rear zone washcoat slurry for Inventive Catalyst 1 and the top layer washcoat of Inventive catalyst 1 were prepared in the same way as for Reference Catalyst 1, respectively.

Washcoat coating application was the same as for Reference Catalyst 1.

Inventive Catalyst 2—Pre-Solution of Pd, Ba Acetate and Taurine
Bottom Layer Front Zone Washcoat Slurry was Prepared by:
(i) mixing a solution of palladium nitrate and barium acetate,
(ii) adding taurine to the mixed solution (i) above and keep mixing,
(iii) milling and making a slurry containing 4% La$_2$O$_3$ doped alumina separately,
(iv) adding the pre-solution in step (ii) to the pre-milled 4% La$_2$O$_3$-doped alumina slurry (iii) and mixing;
(v) milling and making a slurry containing a ceria and zirconia mixed oxide separately,
(vi) adding the resulting ceria zirconia mixed oxide slurry (v) to the batch at step (iv),
(vii) thickening the washcoat slurry in (vi) with rheology modifier.

The final compositions of the bottom layer front zone washcoat contained ceria zirconia composite 1.6 g/in$^3$, 4% La$_2$O$_3$-doped alumina 0.7 g/in$^3$, Ba element 300 g/ft$^3$, and Pd element 98 g/ft$^3$.

The bottom layer rear zone washcoat slurry for Inventive Catalyst 2 and the top layer washcoat of Inventive catalyst 2 were prepared in the same way as for Reference Catalyst 1, respectively.

Washcoat coating application was the same as for Reference Catalyst 1.

EXAMPLE 1

XRD Analysis of Ba and Pd Species

The crystallite size of the Ba species of all the catalysts was analyzed by XRD and the results are shown in Table 1.

TABLE 1

| | XRD Results | |
|---|---|---|
| Catalysts | Ba species and crystalline size (nm) Fresh | PdO crystalline size (nm) Aged |
| Reference Catalyst 1 | Witherite 36 ± 5 | 61 ± 7 |
| Reference Catalyst 2 | Baryte 32 ± 1 | 80 ± 20 |
| Inventive Catalyst 1 | Baryte 16 ± 0.5 | 55 ± 6 |
| Inventive Catalyst 2 | Baryte 16 ± 1 | 55 ± 6 |

Witherite (BaCO$_3$) was detected in Reference Catalyst 1 as it was made by a taurine-free process. The estimated crystallite size of BaCO$_3$ was about 36 nm with a standard deviation of 5 nm. Baryte (BaSO$_4$) was detected in Reference Catalyst 2 and the two inventive catalysts with the presence of taurine in washcoat batching. BaSO$_4$ crystallite size of the two inventive catalysts were about ~16 nm, which is much smaller than Reference Catalyst 2 (~32 nm) made by a pre-fired powder process. They are also significantly smaller than Reference Catalyst 1 (~36 nm) prepared by the standard batching process without taurine. No XRD peak originated from Pd species (Pd or PdO) in fresh catalysts, indicating that Pd species is highly dispersed.

Ba is a well-known Pd promoter in TWC technology. It can donate electrons to Pd, making the electron configuration of P$^{(II)}$ more like Rh, and can therefore improve the rich NOx reduction function of Pd. In order to maximize this promotion effect, Ba—Pd intimate contact is desirable. Typically, the Pd species is highly dispersed (not measurable by XRD in this study) and the majority is located in the pore of support materials. A smaller particle size of Ba species is favored due to, inter alia, there being a higher chance to get into the pore of the supports, resulting in close proximity of the Ba with the Pd. The two inventive catalysts obtain fresh Ba species having approximately half the size of those in the references, with enhanced Pd—Ba interaction and improved rich NOx conversion therefore expected.

All catalysts were engine bench aged for 100 hours with stoic/fuel cut aging cycles targeting peak temperature of catalyst bed at 1000° C. Washcoat scrapped from the coated monolith was used for XRD measurement.

Multiple Ba species were detected in the aged catalysts, including Ba aluminum oxide (BaAl$_2$O$_4$), hexacelsian (BaAl$_2$Si$_2$O$_8$) and witherite (BaCO$_3$). Each of them has concentrations below the detection limitation for an accurate size measurement. Crystalline PdO was detected in aged samples and crystallite sizes are reported in Table 1. The smaller Rietveld crystallite size of PdO in both Inventive Catalysts implies that sintering of Pd species is suppressed. The results are consistent with other literature reports, where Ba addition increases the thermal stability of PdO species. The smaller the PdO crystallite size, the higher the thermal stability.

EXAMPLE 2

FE-EPMA Analysis of Pd and Ba Interaction

The Pearson correlation coefficients (product moment correlation coefficient) are calculated based on the results of area analysis by FE-EPMA and shown in Table 2. All fresh catalysts have similarly high Pd—Ba coefficients, which is around 0.7-0.8. However, aged Inventive Catalyst 1 and Inventive Catalyst 2 demonstrate much higher Pd—Ba co-location than the reference catalysts. This means that the alkaline earth metal element and the palladium are highly correlated in the inventive catalysts even after TWC ageing. Thus, the ability of the alkaline earth metal to act as a promoter species for the palladium is optimised.

TABLE 2

Pearson Correlation Coefficient by EPMA

| Catalysts | Pearson Correlation Coefficient of Pd—Ba by FE-EPMA | |
|---|---|---|
| | Fresh | Aged |
| Reference Catalyst 1 | 0.73 | 0.76 |
| Reference Catalyst 2 | 0.55 | 0.66 |
| Inventive Catalyst 1 | 0.78 | 0.79 |
| Inventive Catalyst 2 | 0.85 | 0.84 |

EXAMPLE 3

Light Off Performances Test in Engine Testing

All catalysts were engine bench aged for 100 hours with stoic/fuel cut aging cycles targeting peak temperature of catalyst bed at 1000° C. and tested over a gasoline engine. The light off performance is a typical condition with a gas volumetric space velocity of 115 K/hr, temperature ramp is 30° C./min, the lambda of Air and Fuel Ratio (AFR) is perturbed at 14.45 with 0.5 amplitude. The conversion of THC, CO and $NO_x$ were calculated by comparing the concentration of the feed gas and the gas at the outlets of the catalysts.

The HC, CO and $NO_x$ $T_{50}$ light off temperatures are shown in Table 3. The data indicates clearly that both Inventive Catalyst 1 and Inventive Catalyst 2 of the present invention give significantly improved light-off performance when compared with the two Reference Catalysts. In particular, Inventive Catalyst 2 is more active than Inventive Catalyst 1 with about 15~20° C. lower $T_{50}$ ($T_{50}$ is the temperature when the conversion reaches 50%).

TABLE 3

Engine Bench Light Off Test Results

| Pollutant | $T_{50}$ (° C.) Reference Catalyst 1 | $T_{50}$ (° C.) Reference Catalyst 2 | $T_{50}$ (° C.) Inventive Catalyst 1 | $T_{50}$ (° C.) Inventive Catalyst 2 |
|---|---|---|---|---|
| HC | 379 | 379 | 364 | 348 |
| CO | 384 | 384 | 372 | 359 |
| $NO_x$ | 395 | 388 | 378 | 364 |

EXAMPLE 4

Lambda Sweep Test in Engine Testing

The lambda sweep test is a typical condition with a gas volumetric space velocity of 115 K/hr, temperature fixed at 400° C., the lambda of Air and Fuel Ratio (AFR) sweeps from15.5 to 13.5 with 0.5 amplitude perturbed during the sweep. The conversion of THC, CO and $NO_x$ were calculated from comparing the concentration of the feed gas and the gas at the outlets of the catalysts. All catalysts were engine bench aged for 100 hours with stoic/fuel cut aging cycles targeting peak temperature of catalyst bed at 1000° C. and tested over a gasoline engine.

Figure 8:
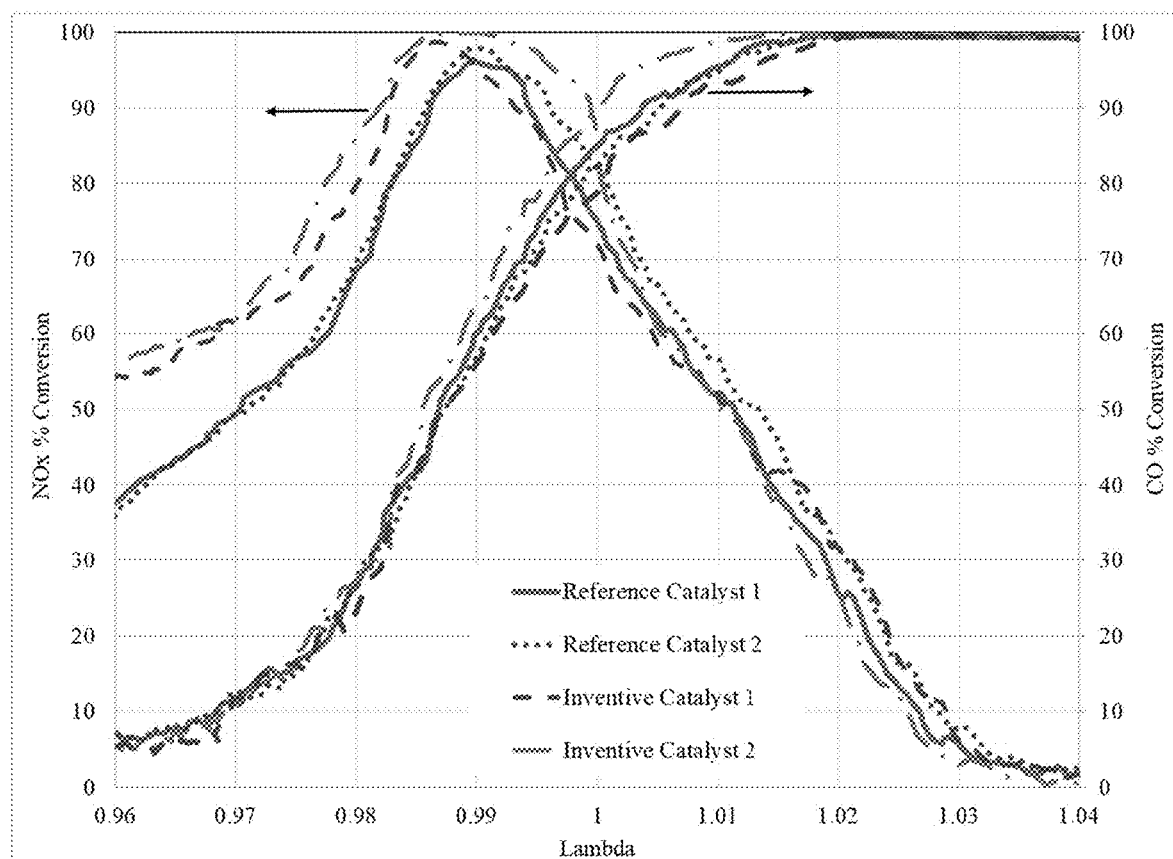
FIG. 8 shows $NO_x$ and CO conversion at different lambda (air/fuel ratio) values for the Reference and Inventive Catalysts according to the present invention.
Figure 9:
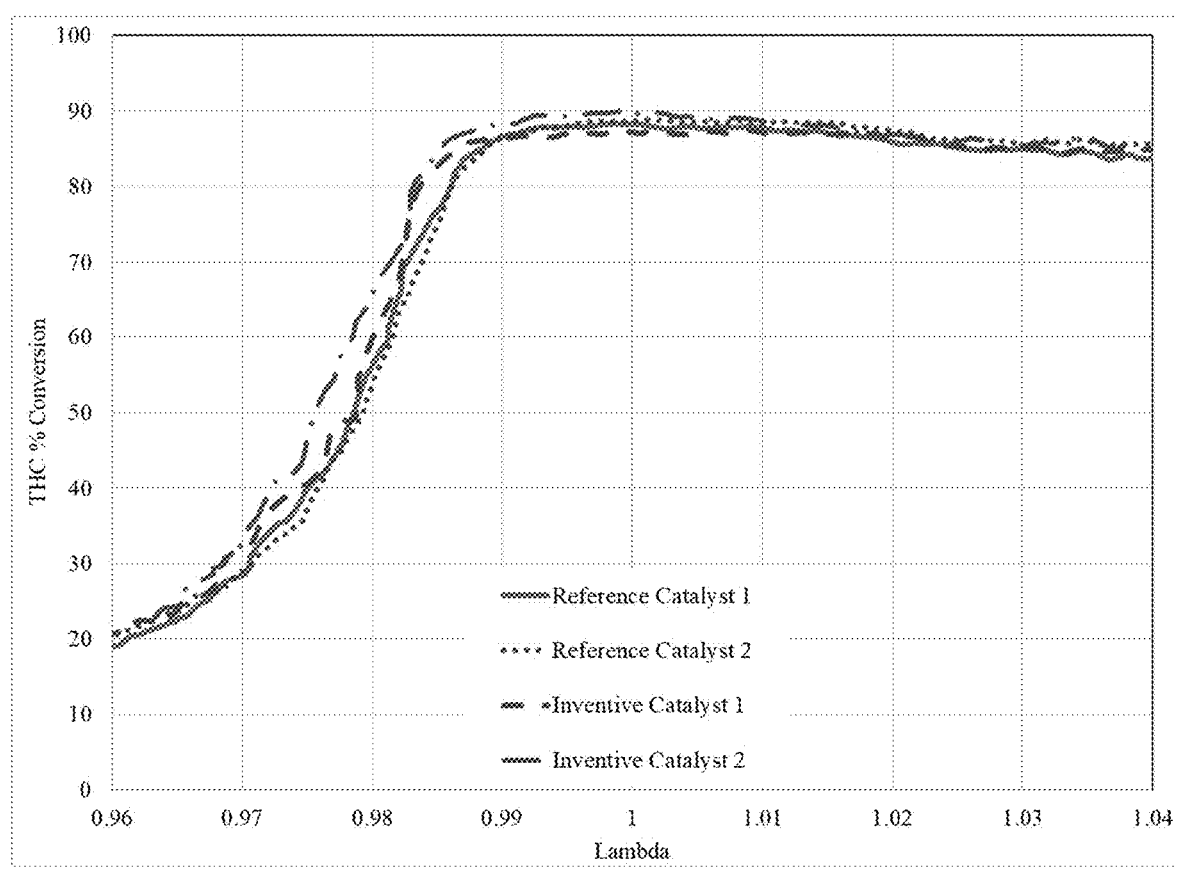
FIG. 9 shows THC (total hydrocarbon) conversion at different lambda values for the Reference and Inventive Catalysts according to the present invention.

The CO and $NO_x$ conversion traces are shown in FIG. 8. The data clearly indicate that both Inventive Catalyst 1 and Inventive Catalyst 2 of the present invention give significantly improved $NO_x$ conversion at rich conditions when lambda is below 0.985. Inventive Catalyst 2, specifically, also shows about ~10% higher of CO and $NO_x$ conversions at the stoichiometric point when lambda is close to 1 (CO—$NO_x$ crossover point) and a broader lambda window than the two reference catalysts. The THC conversion traces are shown in FIG. 9. Inventive Catalyst 2 is more active than Reference Catalysts 1 and 2 with higher THC conversion at rich side when lambda is below 0.99. Improved rich activity of the inventive catalysts is thought to be associated with a closer Pd—Ba interaction.

EXAMPLE 5

Warm-Up Test in Engine Testing

All catalysts were engine bench aged for 100 hours with stoic/fuel cut aging cycles targeting peak temperature of catalyst bed at 1000° C. and tested over a gasoline engine. The warm-up test was typically conducted at 95K gas hourly space velocity. Pollutants from the engine out were preheated to 490° C. then directed to the cold catalyst. Time to reach 50% conversion of total hydrocarbon, carbon monoxide and NOx were recorded and named $T_{50}$HC, $T_{50}$CO and $T_{50}NO_x$, respectively. The conversion of THC, CO and $NO_x$ were calculated by comparing the concentration of the feed gas and the gas at the outlets of the catalysts. Similarly, time to reach 75% for each pollutant was also recorded and named $T_{75}$HC, $T_{75}$CO and $T_{75}NO_x$.

The data in Table 4 indicate clearly that both Inventive Catalyst 1 and Inventive Catalyst 2 of the present invention warm up faster than two Reference Catalysts. In particular, Inventive Catalyst 2 is even more active than Inventive Catalyst 1 exhibiting the shortest time to reach the certain conversion levels.

TABLE 4

Engine Bench Warm Up Test Results

| Time (sec) | Reference Catalyst 1 | Reference Catalyst 2 | Inventive Catalyst 1 | Inventive Catalyst 2 |
|---|---|---|---|---|
| $T_{50}$ HC | 7.075 | 7.125 | 6.875 | 6.45 |
| $T_{50}$ CO | 7.55 | 9.225 | 6.475 | 6.2 |
| $T_{50}NO_x$ | 8.55 | 9.4 | 8.325 | 7.8 |
| $T_{75}$ HC | 11.575 | 11.425 | 10.725 | 10.2 |
| $T_{75}$ CO | 12.3 | 15.2 | 10.2 | 10.05 |
| $T_{75}$ $NO_x$ | 13.9 | 15.525 | 12.825 | 12.725 |

The foregoing detailed description has been provided by way of explanation and illustration and is not intended to limit the scope of the appended claims. Many variations in the presently preferred embodiments illustrated herein will be apparent to one of ordinary skill in the art and remain within the scope of the appended claims and their equivalents.

The invention claimed is:

1. A catalyst article for use in an emissions treatment system, the catalyst article comprising:
   a substrate; and
   a first catalytic region on the substrate;
   wherein the first catalytic region comprises a support material, palladium nanoparticles and alkaline-earth metal sulfate nanoparticles; and
   wherein when a cross section of the first catalytic region of the catalyst article is subjected to area analysis by FE-EPMA under conditions of pixel (section) size of 0.34 μm ×0.34 μm and number of measured pixels (sections) of 256×256, a characteristic X-ray intensity (α: cps) of alkaline-earth metal element (Ae) and a characteristic X-ray intensity (β: cps) of the palladium (Pd) are measured for each pixel, and the Pearson correlation coefficient calculated using the resulting a and 0 in each pixel is designated as $R_{Ae/Pd}$, then the value of $R_{Ae/Pd}$ is at least 0.75.

2. The catalyst article of claim 1, wherein the palladium nanoparticles have a Rietveld crystallite size of no more than 60 nm and/or the alkaline-earth metal sulfate nanoparticles have a crystallite size of no more than 50 nm after aging at 1000° C. for 100 hours, preferably wherein the palladium nanoparticles have a crystallite size of no more than 40 nm and/or the alkaline-earth metal sulfate nanoparticles have a crystallite size of no more than 30 nm after aging at 1000° C. for 100 hours.

3. The catalyst article of claim 1, wherein the alkaline-earth metal of the alkaline-earth metal sulfate comprises one or more of calcium, strontium and barium, preferably barium.

4. The catalyst article of claim 1 comprising a first catalytic region and a second catalytic region;
   wherein the first catalytic region comprises a support material, palladium nanoparticles and alkaline-earth metal sulfate nanoparticles; and
   wherein the second catalytic region comprises platinum and/or rhodium.

5. The catalyst article of claim 4, wherein the first catalytic region forms a first layer on the substrate and the second catalytic region forms a second layer on the substrate, the first layer extending from a first end of the substrate and the second layer extending from a second end of the substrate, preferably wherein first and second catalytic regions are each disposed directly onto the substrate.

6. The catalyst article of claim 4 further comprising a third catalytic region, wherein the second catalytic region comprises platinum; and optionally wherein the third catalytic region comprises rhodium and is disposed on top of the first catalytic region and/or the second catalytic region such that the first and/or second catalytic regions are each located between the third catalytic region and the substrate.

7. A catalyst article for use in an emissions treatment system, the catalyst article comprising:
   a substrate; and
   a first catalytic region on the substrate;
   wherein the first catalytic region comprises a support material, palladium nanoparticles and alkaline-earth metal sulfate nanoparticles;
   wherein the alkaline-earth metal sulfate nanoparticles have a crystallite size of from 0.1 nm to 30 nm; and
   wherein the palladium nanoparticles have a crystallite size of from 5 nm to 15 nm.

* * * * *